US012764272B2

(12) United States Patent
Lin et al.

(10) Patent No.: US 12,764,272 B2
(45) Date of Patent: Oct. 13, 2026

(54) FUSION IMPROVEMENT AND SUB-PEL PRECISION MODE FOR TEMPLATE MATCHING RELATED TOOLS FOR VIDEO CODING

(71) Applicant: QUALCOMM Incorporated, San Diego, CA (US)

(72) Inventors: Po-Han Lin, Taipei (TW); Jian-Liang Lin, Su'ao Township (TW); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 18/617,841

(22) Filed: Mar. 27, 2024

(65) Prior Publication Data

US 2024/0333911 A1 Oct. 3, 2024

Related U.S. Application Data

(60) Provisional application No. 63/492,729, filed on Mar. 28, 2023.

(51) Int. Cl.
*H04N 19/105* (2014.01)
*H04N 19/176* (2014.01)
(Continued)

(52) U.S. Cl.
CPC ......... *H04N 19/105* (2014.11); *H04N 19/176* (2014.11); *H04N 19/52* (2014.11); *H04N 19/70* (2014.11); *H04N 19/80* (2014.11)

(58) Field of Classification Search
CPC .. H04N 19/105; H04N 19/117; H04N 19/147; H04N 19/176; H04N 19/52;
(Continued)

(56) References Cited

U.S. PATENT DOCUMENTS

2016/0286232 A1* 9/2016 Li ........................ H04N 19/513
2018/0270500 A1* 9/2018 Li .......................... H04N 19/52
(Continued)

FOREIGN PATENT DOCUMENTS

CN 112640462 A * 4/2021 ........... H04N 19/176
WO WO-2019110132 A1 * 6/2019 ........... H04N 19/513
WO WO-2023034152 A1 * 3/2023 ........... H04N 19/196

OTHER PUBLICATIONS

Bross B., et al., "Versatile Video Coding Editorial Refinements on Draft 10", JVET-T2001-v2, Joint Video Experts Team (JVET) of ITU-T SG 16 WP 3 and ISO/IEC JTC 1/SC 2920th Meeting, by Teleconference, Oct. 7-16, 2020, pp. 1-514.
(Continued)

*Primary Examiner* — Anner Holder
(74) *Attorney, Agent, or Firm* — Shumaker & Sieffert, P.A.

(57) ABSTRACT

A method of encoding or decoding video data, the method comprising: applying a sub-pel precision mode to generate a prediction block for a current block of the video data, wherein a syntax element indicates that the sub-pel precision mode is applied to the current block and applying the sub-pel precision mode comprises: applying an interpolation filter to samples of a reference region to generate an array of samples at full-pel and sub-pel precision; and identifying, within the array, a reference template of the prediction block, wherein the reference template of the prediction block is a best match for a template of the current block within the array, wherein a template pattern defines a shape of the reference template of the prediction block and the template of the current block; and encoding or decoding the current block using the prediction block for the current block.

24 Claims, 13 Drawing Sheets

(51) Int. Cl.
*H04N 19/52* (2014.01)
*H04N 19/70* (2014.01)
*H04N 19/80* (2014.01)

(58) Field of Classification Search
CPC .... H04N 19/523; H04N 19/593; H04N 19/70; H04N 19/80
See application file for complete search history.

(56) References Cited

U.S. PATENT DOCUMENTS

| | | | | |
|---|---|---|---|---|
| 2019/0014342 | A1* | 1/2019 | Li | H04N 19/55 |
| 2021/0250606 | A1* | 8/2021 | Choi | H04N 19/52 |
| 2021/0274172 | A1* | 9/2021 | Lim | H04N 19/119 |
| 2021/0360239 | A1* | 11/2021 | Li | H04N 19/159 |
| 2022/0248047 | A1* | 8/2022 | Chen | H04N 19/52 |
| 2024/0388692 | A1* | 11/2024 | Vishwanath | H04N 19/176 |

OTHER PUBLICATIONS

Chen J., et al., "Algorithm Description for Versatile Video Coding and Test Model 10 (VTM 10)", JVET-S2002-v1, Joint Video Experts Team (JVET) of ITU-T SG 16 WP 3 and ISO/IEC JTC 1/SC 29/WG 11 19th Meeting: by Teleconference, Jun. 22-Jul. 1, 2020, pp. 1-98.

Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-101.

Chen J., et al., "Algorithm Description for Versatile Video Coding and Test Model 4 (VTM 4)", JVET-M1002-v2, Joint Video Experts Team (JVET) of ITU-T SG 16 WP 3 and ISO/IEC JTC 1/SC 29/WG 11 13th Meeting, Marrakech, MA, Jan. 9-18, 2019, pp. 1-64.

Chen Y., et al., "Description of SDR, HDR and 360° Video Coding Technology Proposal by Qualcomm and Technicolor—Low and High Complexity Versions", 10. JVET Meeting, Apr. 10, 2018-Apr. 20, 2018, San Diego, (The Joint Video Exploration Team of ISO/IEC JTC1/SC29/WG11 and ITU-T SG.16 ), No. JVET-J0021, Apr. 14, 2018, pp. 1-42, XP030248216, [retrieved on Apr. 14, 2018].

Coban M., et al., "Algorithm Description of Enhanced Compression Model 6 (ECM 6)", JVET-AA2025, Joint Video Experts Team (JVET) of ITU-T SG 16 WP 3 and ISO/IEC JTC 1/SC 29 27th Meeting, by Teleconference, Jul. 13-22, 2022, pp. 1-54, JVET-AA2025-v1.

Coban M., et al., "Algorithm Description of Enhanced Compression Model 8 (ECM 8)", JVET-AC2025, Joint Video Experts Team (JVET) of ITU-T SG 16 WP 3 and ISO/IEC JTC 1/SC 29, 29th Meeting, by teleconference, Jan. 11-20, 2023, pp. 1-74, JVET-AC2025-v1.

Huo J., et al., "EE2-1.15a: Intra Template Matching (Intra TMP) Based on Linear Filter Model", Xidian University, JVET-AD0112-v3, Joint Video Experts Team (JVET) of ITU-T SG 16 WP 3 and ISO/IEC JTC 1/SC 29 30th Meeting, Antalya, TR, Apr. 21-28, 2023, pp. 1-3.

Huo J., et al., "EE2-1.16: A Fusion method of Intra Template Matching Prediction(Intra TMP)", Xidian University, JVET-AD0116-v2, Joint Video Experts Team (JVET) of ITU-T SG 16 WP 3 and ISO/IEC JTC 1/SC 29 30th Meeting, Antalya, TR, Apr. 21-28, 2023, pp. 1-4.

International Search Report and Written Opinion—PCT/US2024/021943—ISA/EPO—Jun. 21, 2024.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Li (Alibaba-Inc) X., et al., "Non-EE2: Intra TMP with Half-Pel Precision", JVET-AC0087-v2, Joint Video Experts Team (JVET) of ITU-T Sg 16 WP 3 and ISO/IEC JTC 1/SC 29 29th Meeting, by Teleconference, Jan. 11-20, 2023, No. JVET-AC0087, m61660, Jan. 13, 2023, XP030306589, 3 Pages, The Whole Document.

Li X., et al., "EE2-1.12: Intra TMP with sub-pel Precision", Alibaba group, JVET-AD0125-v1, Joint Video Experts Team (JVET) of ITU-T SG 16 WP 3 and ISO/IEC JTC 1/SC 29 30th Meeting, Antalya, TR, Apr. 21-28, 2023, pp. 1-3.

Lin (Qualcomm) P-H., et al., "EE2-1.19: IntraTMP with Multiple Modes", JVET-AD0194-v2, 30 JVET Meeting, Apr. 21, 2023-Apr. 28, 2023, Antalya, (The Joint Video Exploration Team of ISO/IEC JTC1/SC29/WG11 and ITU-T SG.16 ), No. JVET-AD0194, m62876, Apr. 20, 2023, XP030308951, pp. 1-6.

Lin (Qualcomm) P-H., et al., "Non-EE2: IntraTMP with Multiple Modes", JVET-AC0198-v3, 29 JVET Meeting, Jan. 11, 2023-Jan. 20, 2023, Teleconference, (The Joint Video Exploration Team of ISO/IEC JTC1/SC29/WG11 and ITU-T SG.16 ), No. JVET-AC0198, m61781, Jan. 13, 2023, XP030306891, pp. 1-3, The Whole Document.

Ma Y., et al., "EE2-1.14c Combination Test of EE2-1.14a and EE2-1.14b", Xidian University, JVET-AD0075-v2, Joint Video Experts Team (JVET) of ITU-T SG 16 WP 3 and ISO/IEC JTC 1/SC 29 30th Meeting, Antalya, TR, Apr. 21-28, 2023, pp. 1-2.

Seregin V., et al., "Exploration Experiment on Enhanced Compression Beyond VVC Capability (EE2)", Joint Video Experts Team (JVET) of ITU-T SG 16 WP 3 and ISO/IEC JTC 1/SC 29, JVET-AC2024-v2, 29th Meeting, by teleconference, Jan. 11-20, 2023, pp. 1-30.

Seregin V., et al., "Exploration Experiment on Enhanced Compression beyond VVC capability (EE2)", JVET-AC2024-v2, Joint Video Experts Team (JVET) of ITU-T SG 16 WP 3 and ISO/IEC JTC 1/SC 29 29th Meeting, by teleconference, Jan. 11-20, 2023, JVET-AC2024-v1, m62414, No. JVET-AC2024, Feb. 20, 2023, XP030308365, 27 Pages.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, 20120101, 20 Pages.

Wang F., et al., "EE2-1.10 Multi-Candidate IntraTMP", OPPO, JVET-AD0073-v2, Joint Video Experts Team (JVET) of ITU-T SG 16 WP 3 and ISO/IEC JTC 1/SC 29 30th Meeting, Antalya, TR, Apr. 21-28, 2023, pp. 1-4.

Wang F., et al., "EE2-1.20i/j: Combination of IntraTMP Tests", OPPO, JVET-AD0086-v4, Joint Video Experts Team (JVET) of ITU-T SG 16 WP 3 and ISO/IEC JTC 1/SC 29 30th Meeting, Antalya, TR, Apr. 21-28, 2023, pp. 1-5.

Wang Y., et al., "EE2-1.20m: Combination test of Test 1.17 and Test 1.18", JVET-AD0119-v2, Joint Video Experts Team (JVET) of ITU-T SG 16 WP 3 and ISO/IEC JTC 1/SC 2930th Meeting, Antalya, TR, Apr. 21-28, 2023, pp. 1-3.

Wang Y-K., et al., "High Efficiency Video Coding (HEVC) Defect Report", JCTVC-N1003-v1, Joint Collaborative Team on Video Coding (JCT-VC) of ITU-T SG 16 WP 3 and ISO/IEC JTC 1/SC 29/WG 11 14th Meeting: Vienna, AT, Jul. 25-Aug. 2, 2013, 311 Pages, JCTVC-N1003.

Zhang L., et al., "EE2-1.11: Intra Template Matching Prediction Fusion", JVET-AD0072-v2, Joint Video Experts Team (JVET) of ITU-T SG 16 WP 3 and ISO/IEC JTC 1/SC 29, 30th Meeting, Apr. 21, 2023-Apr. 28, 2023, Antalya, TR, Apr. 17, 2023, pp. 1-5, XP030308662.

Zhang (OPPO) L., et al., "Non-EE2: Intra Template-Matching Prediction Fusion", JVET-AC0069-v2, Joint Video Experts Team (JVET) of ITU-T SG 16 WP 3 and ISO/IEC JTC 1/SC 29, 29th Meeting, by Teleconference, Jan. 11, 2023-Jan. 20, 2023, No. JVET-AC0069, m61638, Jan. 13, 2023, pp. 1-5, XP030306545, The Whole Document.

* cited by examiner

FUSION IMPROVEMENT AND SUB-PEL PRECISION MODE FOR TEMPLATE MATCHING RELATED TOOLS FOR VIDEO CODING

This application claims the benefit of U.S. Provisional Patent Application 63/492,729, filed Mar. 28, 2023, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called “smart phones,” video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for methods (e.g., template type, fusion) and syntax using in the template matching (TM) related tools. The disclosed methods can be applied to any of the existing video codecs, such as HEVC (High Efficiency Video Coding), VVC (Versatile Video Coding), Essential Video Coding (EVC) or be an efficient coding tool in future video coding standards (e.g., ECM (Enhanced Compression Model)). This disclosure describes techniques in which a video encoder or video decoder may use different template types, use sub-pel interpolation, store more candidates and apply fusion to combine these different candidates which are found by the different methods. These techniques may improve video coding efficiency.

In one example, a method includes a method of encoding or decoding video data, the method comprising: determining a template pattern from among a plurality of template patterns; identifying, based on the determined template pattern, a prediction block for a current block of the video data; and encoding or decoding the current block using the prediction block, wherein a syntax element is signaled to indicate the determined template pattern.

In another example, this disclosure describes a method of encoding or decoding video data, the method comprising: applying a sub-pel precision mode to generate a prediction block for a current block of the video data, wherein applying the sub-pel precision mode comprises: applying an interpolation filter to samples of a reference region to generate a reference region that includes an array of samples at full-pel and sub-pel precision; and using a template pattern to identify, within the array, a prediction block for a current block of the video data, wherein a block vector indicating a displacement between the current block and the prediction block has sub-pel accuracy; and encoding or decoding the current block using the prediction block.

In another example, this disclosure describes a method of encoding or decoding video data, the method comprising: generating template matching (TM) candidates, wherein each of the TM candidates is associated with a different reference block; generating, based on a combination of two or more of the TM candidates, a predictor for a current block of the video data; and encoding or decoding the current block using the predictor.

In another example, this disclosure describes a method of encoding or decoding video data, the method comprising: applying a sub-pel precision mode to generate a prediction block for a current block of the video data, wherein a syntax element indicates that the sub-pel precision mode is applied to the current block and applying the sub-pel precision mode comprises: applying an interpolation filter to samples of a reference region to generate an array of samples at full-pel and sub-pel precision; and identifying, within the array, a reference template of the prediction block, wherein the reference template of the prediction block is a best match for a template of the current block within the array, wherein a template pattern defines a shape of the reference template of the prediction block and the template of the current block; and encoding or decoding the current block using the prediction block for the current block.

In another example, this disclosure describes a device for coding video data, the device comprising: memory to store the video data; and one or more processors implemented in circuitry, the one or more processors configured to: apply a sub-pel precision mode to generate a prediction block for a current block of the video data, wherein a syntax element is signaled to indicate that the sub-pel precision mode is applied to the current block and the one or more processors are configured to, applying the sub-pel precision mode: apply an interpolation filter to samples of a reference region to generate an array of samples at full-pel and sub-pel precision; and identify, within the array, a reference template of the prediction block, wherein the reference template of the prediction block is a best match for a template of the current block within the array, wherein a template pattern defines a shape of the reference template of the prediction block and the template of the current block; and encode or decode the current block using the prediction block for the current block.

In another example, this disclosure describes devices configured to perform the methods set forth in this disclosure.

In another example, this disclosure describes a computer-readable storage medium is encoded with instructions that, when executed, cause a programmable processor to perform the methods set forth in this disclosure.

The details of one or more examples are set forth in the accompanying drawings and the description below. Other features, objects, and advantages will be apparent from the description, drawings, and claims.

DETAILED DESCRIPTION

Template matching techniques involve a video encoder and video decoder searching for a prediction block (i.e., a predictor) for a current block within a search area of a current picture or a reference picture. The video encoder or video decoder evaluates different reference blocks within the search area by comparing reference samples of the current block to reference samples of the reference blocks. The reference samples of a block may be reconstructed samples above and left of the block. The reference samples are confined to specific template patterns, hence the term "template matching."

Typically, when a video coder (e.g., a video encoder or video decoder) searches the search area, the video coder only analyzes pixels at full-pel locations. However, if the video coder were to use an array of samples interpolated from the full-pel locations of the search area to search for a reference template, the video coder may be able to generate a prediction block that is more similar to the current block than would otherwise be possible. The amount of data used to encode the current block may decrease when the prediction block is more similar to the current block. It is further understood that using interpolated samples may unnecessarily increase complexity of the encoding and decoding process for some blocks. Thus, in accordance with a technique of this disclosure, a syntax element may indicate whether the sub-pel precision mode is used applied to a block. If the sub-pel precision mode is not applied to the block, it may be unnecessary for the video decoder to perform the interpolation process, which may converse processing resources.

Hence, in accordance with one or more techniques of this disclosure, a video coder may apply a sub-pel precision mode to generate a prediction block for a current block of the video data. A syntax element indicates that the sub-pel precision mode is applied to the current block. As part of applying the sub-pel precision mode, the video coder may apply an interpolation filter to samples of a reference region to generate an array of samples at full-pel and sub-pel precision. The video coder may identify, within the array, a reference template of the prediction block. The reference template of the prediction block may be a best match for a template of the current block. A template pattern defines a shape of the reference template of the prediction block and the template of the current block. The video coder may encode or decode the current block using the prediction block.

Figure 1:
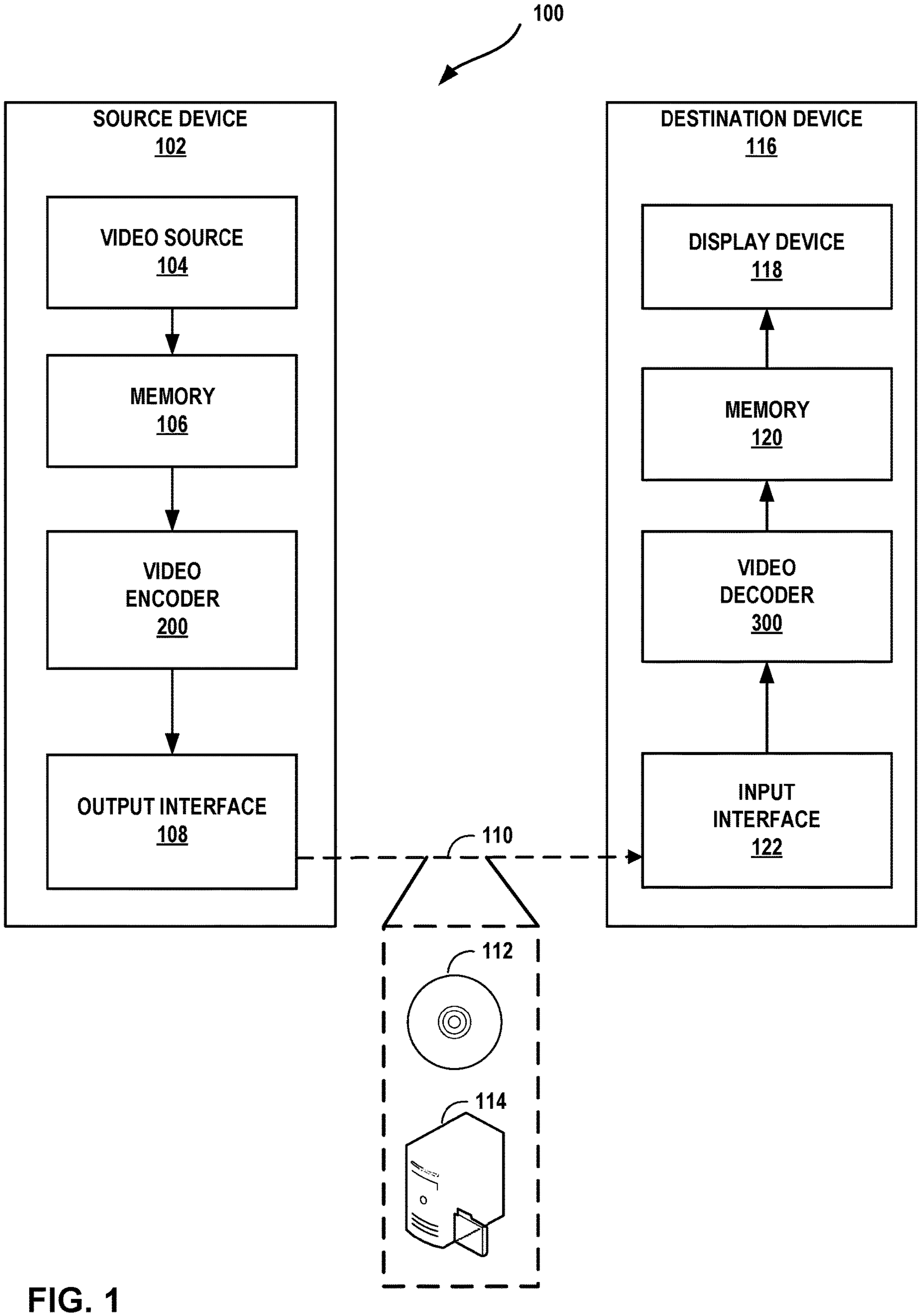
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for template matching. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for template-matching. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use template matching.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with one or more techniques of this disclosure, a video coder, such as video encoder 200 and video decoder 300, may apply a sub-pel precision mode to generate a prediction block for a current block of the video data. A syntax element indicates that the sub-pel precision mode is applied to the current block. Video encoder 200 may signal the syntax element in a bitstream. Video decoder 300 may obtain the syntax element from the bitstream. As part of applying the sub-pel precision mode, the video coder may apply an interpolation filter to samples of a reference region to generate an array of samples at full-pel and sub-pel precision. The video coder may identify, within the array, a reference template of the prediction block, wherein the reference template of the prediction block is a best match for a template of the current block within the array. A template pattern defines a shape of the reference template of the prediction block and the template of the current block. The video coder may encode or decode the current block using the prediction block for the current block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
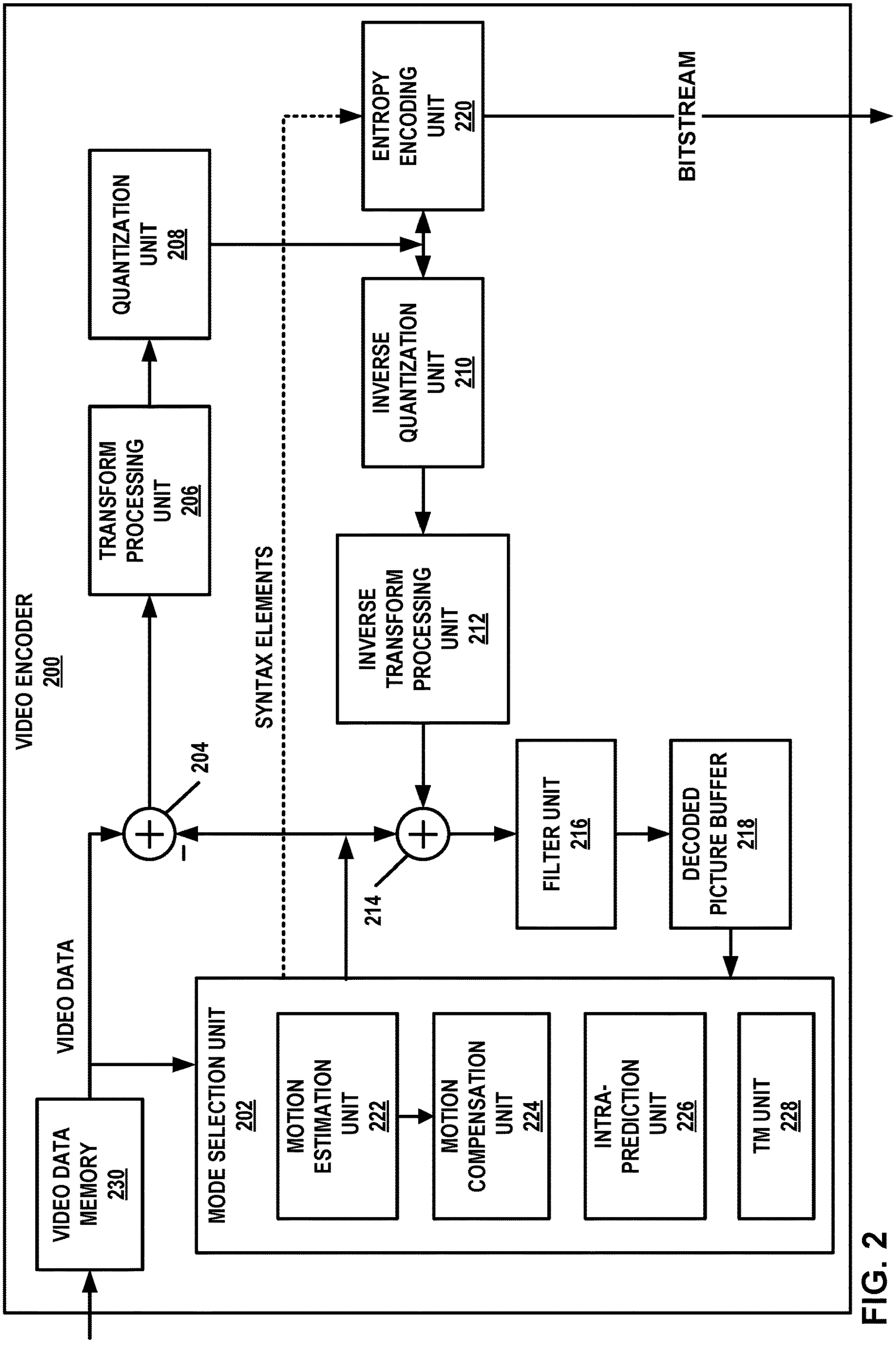
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, an intra-prediction unit 226, and a template matching (TM) 228. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, intra-prediction unit 226, TM unit 228) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

TM unit 228 may perform template-matching process to generate a prediction block for a current block. For instance, TM unit 228 may perform intra template matching prediction or inter template matching, as described elsewhere in this disclosure. In some examples, TM unit 228 may use geometric partitioning modes with template matching. In some examples, TM unit 228 may use template matching with IBC for IBC merge mode and/or IBC AMVP mode. In some examples, TM unit 228 is included in motion estimation unit 222, motion compensation unit 224, and/or intra-prediction unit 226.

In accordance with one or more techniques of this disclosure, TM unit 228 may apply a sub-pel precision mode to generate a prediction block for a current block of the video data. A syntax element may indicate that the sub-pel precision mode is applied to the current block. As part of applying the sub-pel precision mode, TM unit 228 may apply an interpolation filter to samples of a reference region to generate an array of samples at full-pel and sub-pel precision. TM unit 228 may identify, within the array, a reference template of the prediction block. The reference template of the prediction block may be a best match for a template of the current block within the array. A template pattern defines a shape of the reference template of the prediction block and the template of the current block. Remaining units of video encoder 200 (e.g., residual generation unit 204, transform processing unit 206, quantization unit 208, entropy encoding unit 220, etc.) may encode the current block using the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to apply a sub-pel precision mode to generate a prediction block for a current block of the video data, wherein a syntax element indicates that the sub-pel precision mode is applied to the current block and applying the sub-pel precision mode comprises: applying an interpolation filter to samples of a reference region to generate an array of samples at full-pel and sub-pel precision; and identifying, within the array, a reference template of the prediction block, wherein the reference template of the prediction block is a best match for a template of the current block within the array, wherein a template pattern defines a shape of the reference template of the prediction block and the template of the current block; and encode the current block using the prediction block for the current block.

In some examples, video encoder 200 represents an example of a video decoding device including a memory configured to store video data, and one or more processing units implemented in circuitry and configured to determine a template pattern from among a plurality of template patterns; identify, based on the determined template pattern, a prediction block for a current block of the video data; and encode the current block using the prediction block, wherein a syntax element indicates the determined template pattern.

In some examples, video encoder 200 represents an example of a video decoding device including a memory configured to store video data, and one or more processing units implemented in circuitry and configured to generate template matching (TM) candidates, wherein each of the TM candidates is associated with a different reference block; generate, based on a combination of two or more of the TM candidates, a predictor for a current block of the video data; and encode the current block using the predictor.

In some examples, video encoder 200 represents an example of a video decoding device including a memory configured to store video data, and one or more processing units implemented in circuitry and configured to generate TM candidates, wherein each of the TM candidates is associated with a different reference block; generate, based on a combination of two or more of the TM candidates, a predictor for a current block of the video data; and encode the current block using the predictor.

Figure 3:
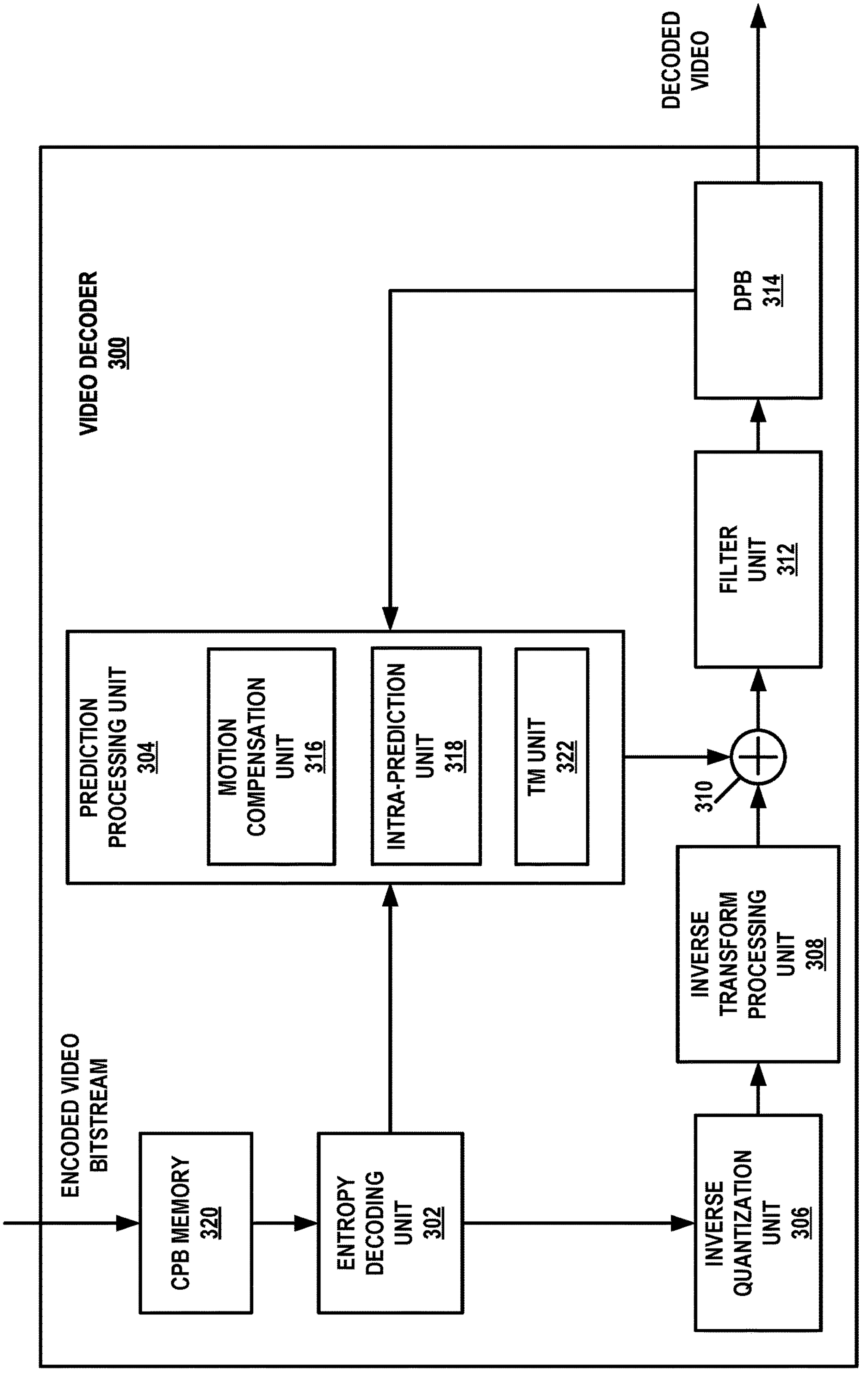
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316, intra-prediction unit 318, and a TM unit 322. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

TM unit 322 may perform template-matching process to generate a prediction block for a current block. For instance, TM unit 322 may perform intra template matching prediction or inter template matching, as described elsewhere in this disclosure. In some examples, TM unit 322 may use geometric partitioning modes with template matching. In some examples, TM unit 322 may use template matching with IBC for IBC merge mode and/or IBC AMVP mode. In some examples, TM unit 322 is included in motion compensation unit 316, and/or intra-prediction unit 318.

In accordance with one or more techniques of this disclosure, TM unit 322 may apply a sub-pel precision mode to generate a prediction block for a current block of the video data. A syntax element may indicate that the sub-pel precision mode is applied to the current block. As part of applying the sub-pel precision mode, TM unit 322 may apply an interpolation filter to samples of a reference region to generate an array of samples at full-pel and sub-pel precision. TM unit 322 may identify, within the array, a reference template of the prediction block. The reference template of the prediction block may be a best match for a template of the current block within the array. A template pattern defines a shape of the reference template of the prediction block and the template of the current block. Remaining units of video decoder 300 (e.g., reconstruction unit 310, filter unit 312, etc.) may decode the current block using the prediction block.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to apply a sub-pel precision mode to generate a prediction block for a current block of the video data, wherein a syntax element indicates that the sub-pel precision mode is applied to the current block and applying the sub-pel precision mode comprises: applying an interpolation filter to samples of a reference region to generate an array of samples at full-pel and sub-pel precision; and identifying, within the array, a reference template of the prediction block, wherein the reference template of the prediction block is a best match for a template of the current block within the array, wherein a template pattern defines a shape of the reference template of the prediction block and the template of the current block; and decode the current block using the prediction block for the current block.

In this manner, video decoder 300 represents an example of a video decoding device including a memory configured to store video data, and one or more processing units implemented in circuitry and configured to determine a template pattern from among a plurality of template patterns; identify, based on the determined template pattern, a prediction block for a current block of the video data; and decode the current block using the prediction block, wherein a syntax element indicate the determined template pattern.

In some examples, video decoder 300 represents an example of a video decoding device including a memory configured to store video data, and one or more processing units implemented in circuitry and configured to generate template matching (TM) candidates, wherein each of the TM candidates is associated with a different reference block; generate, based on a combination of two or more of the TM candidates, a predictor for a current block of the video data; and decode the current block using the predictor.

In some examples, video decoder 300 represents an example of a video decoding device including a memory configured to store video data, and one or more processing units implemented in circuitry and configured to generate template matching (TM) candidates, wherein each of the TM candidates is associated with a different reference block; generate, based on a combination of two or more of the TM candidates, a predictor for a current block of the video data; and decode the current block using the predictor.

Figure 4:
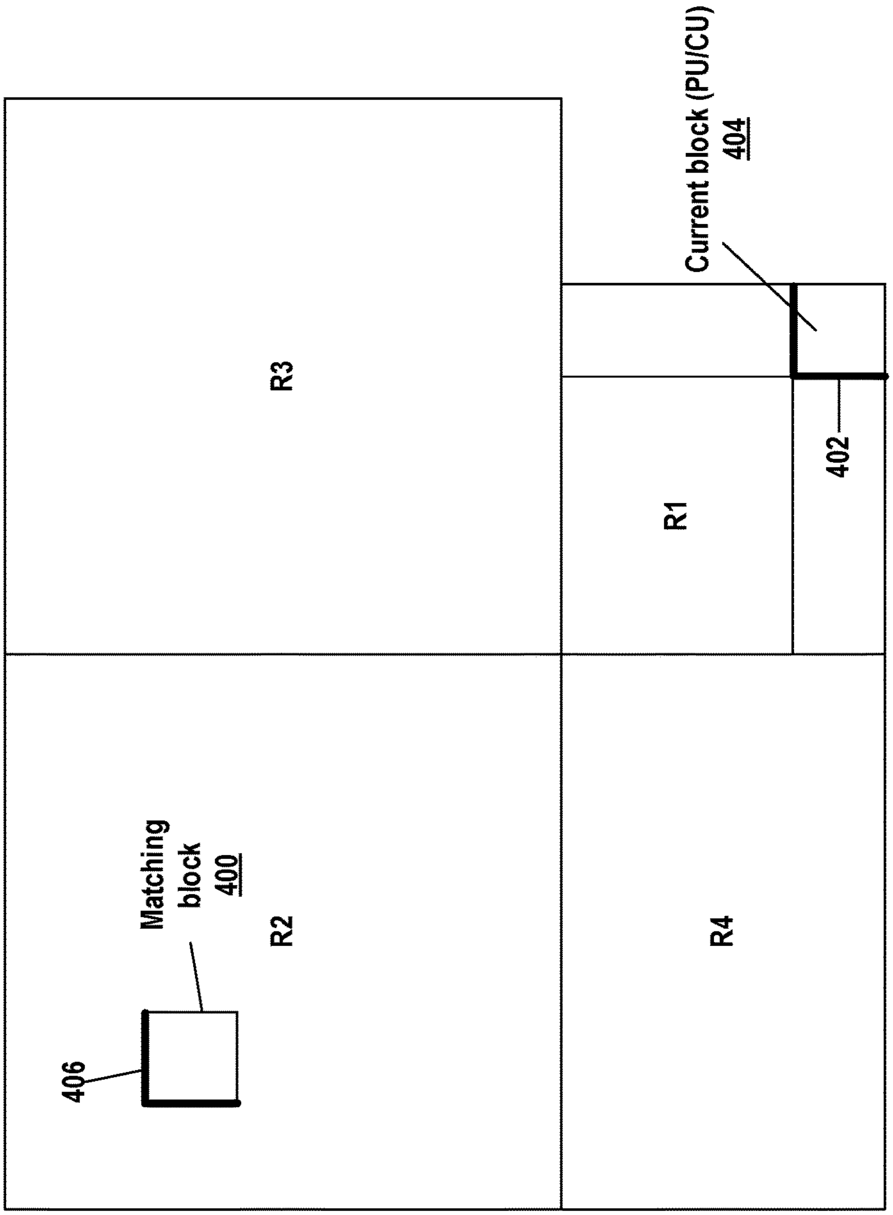
FIG. 4 is a conceptual diagram illustrating an example of an intra template matching search area.

FIG. 4 is a conceptual diagram illustrating an example of an intra template matching search area. Intra template matching prediction (Intra TMP) is a special intra prediction mode that copies the best prediction block from the reconstructed part of the current frame, whose L-shaped template matches the current template. For a predefined search range, video encoder 200 searches for the most similar template to the current template in a reconstructed part of the current frame and uses the corresponding block as a prediction block. Video encoder 200 then signals the usage of this mode, and the same prediction operation is performed at the decoder side by video decoder 300.

A prediction signal (e.g., matching block 400) is generated by matching a current template 402 (which is an L-shaped causal neighbor) of a current block 404 with another block (reference template 406) in a predefined search area. In the example of FIG. 4, the predefined search area may be one of:

R1: current CTU
R2: top-left CTU
R3: above CTU
R4: left CTU

Sum of absolute differences (SAD) is used as a cost function.

Within each region, video decoder 300 searches for the reference template 406 that has least SAD with respect to the current template 402 and uses its corresponding block (matching block 400) as a prediction block.

The dimensions of all regions (SearchRange_w, SearchRange_h) are set proportional to the block dimension (BlkW, BlkH) to have a fixed number of SAD comparisons per pixel. That is:

$$\text{SearchRange\_w} = a * BlkW$$

$$\text{SearchRange\_h} = a * BlkH$$

In the equations above, 'a' is a constant that controls the gain/complexity trade-off. In practice, 'a' may be equal to 5.

The Intra template matching tool is enabled for CUs with size less than or equal to 64 in width and height. This maximum CU size for Intra template matching is configurable. The Intra template matching prediction mode is signaled at CU level through a dedicated flag when decoder-side intra mode derivation (DIMD) is not used for the current CU.

Figure 5:
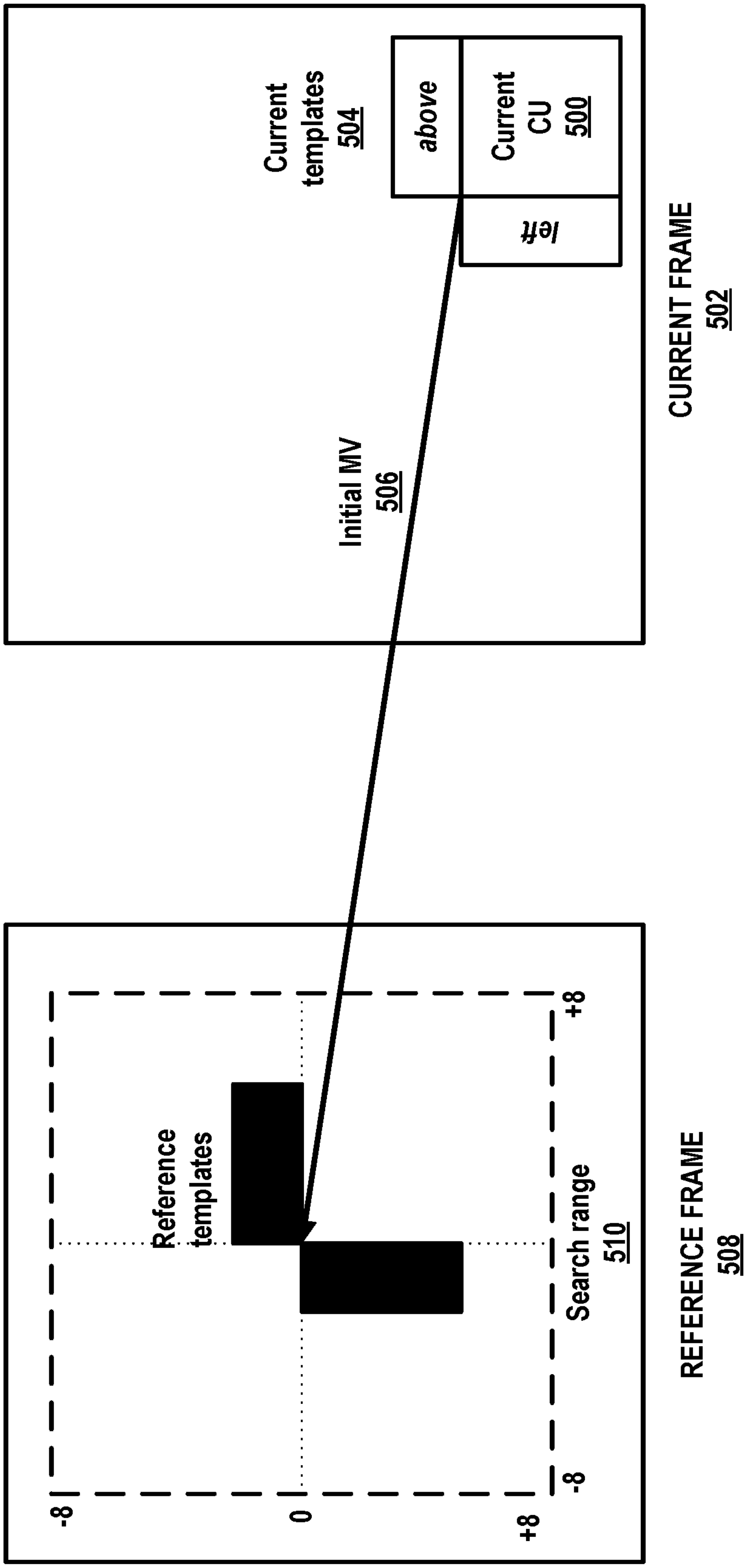
FIG. 5 is a conceptual diagram illustrating an example of template matching performed on a search area around an initial motion vector.

Inter template matching (InterTM) is a decoder-side MV derivation method to refine the motion information of the current CU by finding the closest match between a template (i.e., top and/or left neighbouring blocks of the current CU) in the current picture and a block (i.e., same size to the template) in a reference picture. FIG. 5 is a conceptual diagram illustrating an example of template matching performed on a search area around an initial motion vector (MV). In the example of FIG. 5, a video coder is encoding or decoding a current CU 500 in a current frame 502. Current templates 504 of current CU 500 are above and left of current CU 500. An initial MV 506 of current CU 500 indicates a location in a reference frame 508.

As illustrated in FIG. 5, a video coder (e.g., video encoder 200 or video decoder 300) may search for a better MV (i.e., a motion vector better than initial MV 506) around a location indicated by initial motion vector 506 of current CU 500 within a [−8, +8]-pel search range 510. The template matching method in JVET-J0021 may be used with the following modifications: search step size is determined based on adaptive motion vector resolution (AMVR) mode and InterTM can be cascaded with bilateral matching process in merge modes.

In AMVP mode, a motion vector predictor (MVP) candidate is determined based on template matching error to select the one which reaches the minimum difference between the current block template and the reference block template, and then InterTM is performed only for this particular MVP candidate for MV refinement. InterTM refines this MVP candidate, starting from full-pel motion vector difference (MVD) precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in Table 1, below. This search process ensures that the MVP candidate still keeps the same MV precision as indicated by the AMVR mode after the TM process. In the search process, if the difference between the previous minimum cost and the current minimum cost in the current iteration is less than a threshold that is equal to the area of the block, the search process terminates.

TABLE 1

Search patterns of AMVR and merge mode with AMVR

| | AMVR mode | | | | Merge mode | |
|---|---|---|---|---|---|---|
| Search pattern | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

In merge mode, a similar search method is applied to the merge candidate indicated by the merge index. As Table 1 shows, InterTM may perform all the way down to ⅛-pel MVD precision or skipping those beyond half-pel MVD precision, depending on whether the alternative interpolation filter (that is used when AMVR is of half-pel mode) is used according to merged motion information. Besides, when TM mode is enabled, template matching may work as an independent process or an extra MV refinement process between block-based and subblock-based bilateral matching (BM) methods, depending on whether BM can be enabled or not according to its enabling condition check.

Adaptive reordering of merge candidates with template matching (ARMC-TM) is now discussed. The merge candidates are adaptively reordered with template matching (TM). The reordering method is applied to regular merge mode, TM merge mode, and affine merge mode (excluding the SbTMVP candidate). For the TM merge mode, merge candidates are reordered before the refinement process.

An initial merge candidate list is firstly constructed according to given checking order, such as spatial, temporal motion vector predictors (TMVPs), non-adjacent, history MVPs (HMVPs), pairwise, virtual merge candidates. HMVPs are motion vector predictors of previous coded blocks which are stored in first-in-first-out buffer. Then the candidates in the initial list are divided into several subgroups. For the template matching (TM) merge mode, adaptive decoder motion vector refinement (DMVR) mode, each merge candidate in the initial list is firstly refined by using TM/multi-pass DMVR. Merge candidates in each subgroup are reordered to generate a reordered merge candidate list and the reordering is according to cost values based on template matching. The index of selected merge candidate in the reordered merge candidate list is signaled to video decoder 300. For simplification, merge candidates in the last but not the first subgroup are not reordered. All the zero candidates from the ARMC reordering process are excluded during the construction of Merge motion vector candidates list. The subgroup size is set to 5 for regular merge mode and TM merge mode. The subgroup size is set to 3 for affine merge mode.

The template matching cost of a merge candidate during the reordering process is measured by the SAD between samples of a template of the current block and their corresponding reference samples. The template comprises a set of reconstructed samples neighboring to the current block. Reference samples of the template are located by the motion information of the merge candidate.

Figure 6:
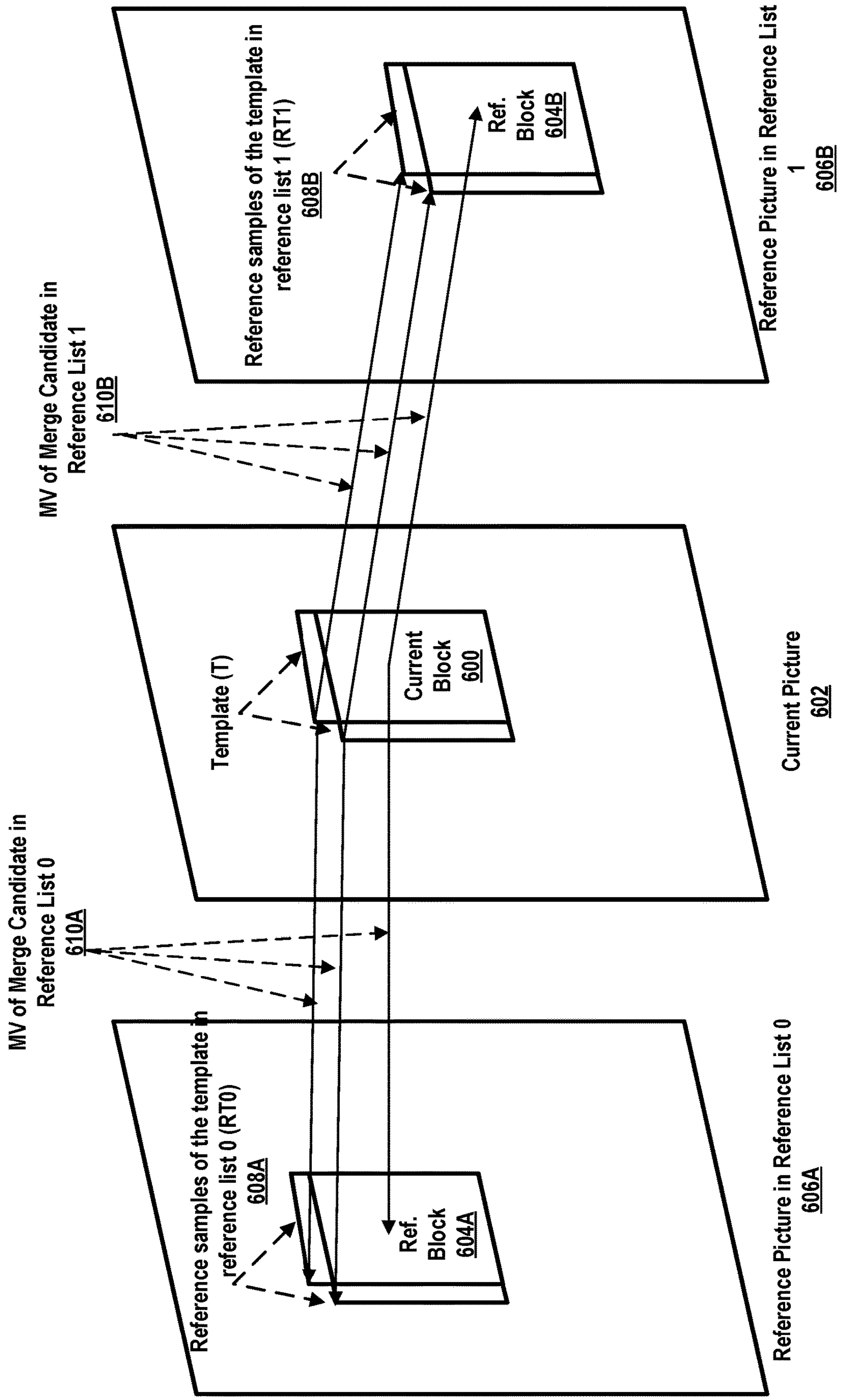
FIG. 6 is a conceptual diagram illustrating an example of template and reference samples of the template in reference pictures.

FIG. 6 is a conceptual diagram illustrating an example of template and reference samples of the template in reference pictures. In the example of FIG. 6, a video coder (e.g., video encoder 200 or video decoder 300) is coding a current block 600 of a current picture 602. When a merge candidate utilizes bi-directional prediction, the reference samples (e.g., reference block 604A in reference picture 606A in reference list 0 and reference block 604B in reference picture 606B in reference list 1) of templates 608A, 608B of the merge candidate are also generated by bi-prediction as shown in FIG. 6. The merge candidate includes motion vectors 610A indicating positions in reference picture 606A and motion vectors 610B indicating positions in reference picture 606B.

When multi-pass DMVR is used to derive the refined motion to the initial merge candidate list only the first pass (i.e., PU level) of multi-pass DMVR is applied in reordering. When template matching is used to derive the refined motion, the template size is set equal to 1. Only the above or left template is used during the motion refinement of TM when the block is flat with block width greater than 2 times of height or narrow with height greater than 2 times of width. TM is extended to perform 1/16-pel MVD precision. The first four merge candidates are reordered with the refined motion in TM merge mode.

Figure 7:
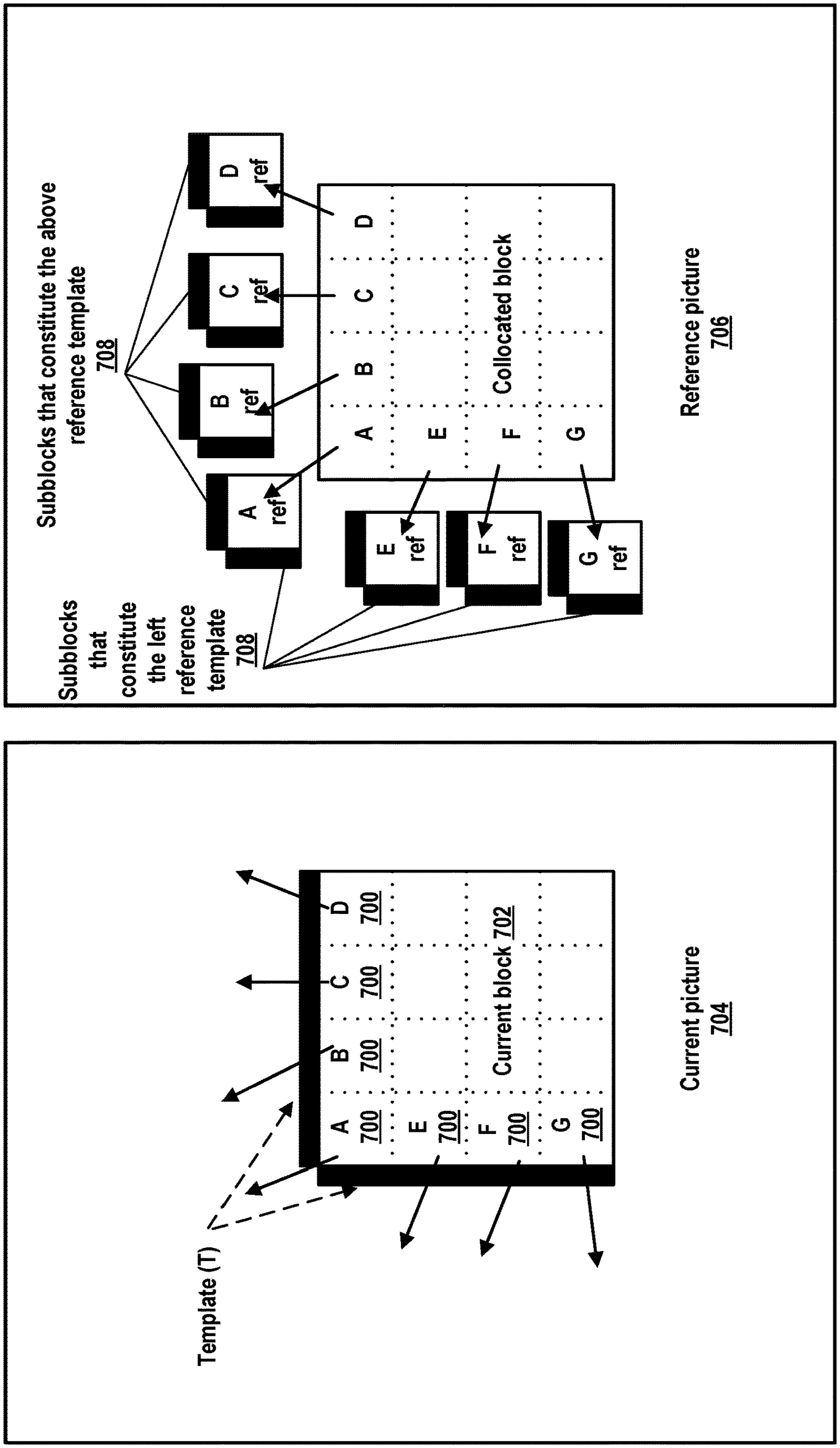
FIG. 7 is a conceptual diagram illustrating example template and reference samples of the template for blocks with sub-block motion using the motion information of the sub-blocks for the current block.

For subblock-based merge candidates with subblock size equal to Wsub×Hsub, the above template comprises several sub-templates with the size of Wsub×1, and the left template comprises several sub-templates with the size of 1×Hsub. FIG. 7 is a conceptual diagram illustrating example template and reference samples of the template for blocks with sub-block motion using the motion information of the sub-blocks 700 for a current block 702 in a current picture 704. As shown in FIG. 7, the motion information of subblocks 700 in the first row and the first column of current block 702 is used to derive reference samples 708 of each sub-template in a reference picture 706.

Reordering criteria are now discussed. In the reordering process, a candidate is considered as redundant if the cost difference between a candidate and its predecessor is inferior to a lambda value e.g., $|D1-D2|<\lambda$, where D1 and D2 are the costs obtained during the first ARMC ordering and $\lambda$ is the Lagrangian parameter used in the RD criterion at encoder side. An example algorithm is defined as the following:

Determine the minimum cost difference between a candidate and its predecessor among all candidates in the list If the minimum cost difference is superior or equal to $\lambda$, the list is considered diverse enough and the reordering stops.

If this minimum cost difference is inferior to $\lambda$, the candidate is considered as redundant and it is moved at a further position in the list. This further position is the first position where the candidate is diverse enough compared to its predecessor.

The algorithm stops after a finite number of iterations (if the minimum cost difference is not inferior to $\lambda$).

This algorithm is applied to the Regular, TM, BM and Affine merge modes. A similar algorithm is applied to the Merge (merge with motion vector difference (MMVD)) and sign MVD prediction methods which also use ARMC for the reordering.

The value of a is set equal to the $\lambda$ of the rate distortion criterion used to select the best merge candidate at the encoder side for low delay configuration and to the value $\lambda$ corresponding to another QP for Random Access configuration. A set of $\lambda$ values corresponding to each signaled QP offset is provided in the SPS or in the Slice Header for the QP offsets which are not present in the SPS.

An extension to AMVP modes is now discussed. The ARMC design is also applicable to the AMVP mode wherein the AMVP candidates are reordered according to the TM cost. For the template matching for advanced motion vector prediction (TM-AMVP) mode, an initial AMVP candidate list is constructed, followed by a refinement from TM to construct a refined AMVP candidate list. In addition, an MVP candidate with a TM cost larger than a threshold, which is equal to five times of the cost of the first MVP candidate, is skipped. Note, when wrap around motion compensation is enabled, the MV candidate shall be clipped with wrap around offset taken into consideration.

Geometric partitioning mode (GPM) with template matching (TM) is now discussed. Template matching is applied to GPM. When GPM mode is enabled for a CU, a CU-level flag is signaled that indicates whether TM is applied to both geometric partitions. Motion information for each geometric partition is refined using TM. When TM is chosen, a template is constructed using left, above or left and above neighboring samples according to partition angle, as shown in Table 2, below. The motion is then refined by minimizing the difference between the current template and the template in the reference picture using the same search pattern of merge mode with half-pel interpolation filter disabled.

TABLE 2

Template for the 1st and 2nd geometric partitions, where A represents using above samples, L represents using left samples, and L + A represents using both left and above samples.

| | Partition angle | | | | | | | | | |
|---|---|---|---|---|---|---|---|---|---|---|
| | 0 | 2 | 3 | 4 | 5 | 8 | 11 | 12 | 13 | 14 |
| 1st partition | A | A | A | A | L + A | L + A | L + A | L + A | A | A |
| 2nd partition | L + A | L + A | L + A | L | L | L | L | L + A | L + A | L + A |

| | Partition angle | | | | | | | | | |
|---|---|---|---|---|---|---|---|---|---|---|
| | 16 | 18 | 19 | 20 | 21 | 24 | 27 | 28 | 29 | 30 |
| 1st partition | A | A | A | A | L + A | L + A | L + A | L + A | A | A |
| 2nd partition | L + A | L + A | L + A | L | L | L | L | L + A | L + A | L + A |

A GPM candidate list is constructed as follows:

1. Interleaved List-0 MV candidates and List-1 MV candidates are derived directly from the regular merge candidate list, where List-0 MV candidates are higher priority than List-1 MV candidates. A pruning method with an adaptive threshold based on the current CU size is applied to remove redundant MV candidates.
2. Interleaved List-1 MV candidates and List-0 MV candidates are further derived directly from the regular merge candidate list, where List-1 MV candidates are higher priority than List-0 MV candidates. The same pruning method with the adaptive threshold is also applied to remove redundant MV candidates.
3. Zero MV candidates are padded until the GPM candidate list is full.

The GPM-MMVD and GPM-TM are exclusively enabled to one GPM CU. This is done by firstly signaling the GPM-MMVD syntax. When both two GPM-MMVD control flags are equal to false (i.e., the GPM-MMVD are disabled for two GPM partitions), the GPM-TM flag indicates whether the template matching is applied to the two GPM partitions. Otherwise (at least one GPM-MMVD flag is equal to true), the value of the GPM-TM flag is inferred to be false.

IBC with template matching is now discussed. Template Matching is used in IBC for both IBC merge mode and IBC AMVP mode. The IBC-TM merge list is modified compared to the one used by regular IBC merge mode such that the candidates are selected according to a pruning method with a motion distance between the candidates as in the regular TM merge mode. The ending zero motion fulfillment is replaced by motion vectors to the left (−W, 0), top (0, −H) and top-left (−W, −H), where W is the width and H the height of the current CU.

In the IBC-TM merge mode, the selected candidates are refined with the Template Matching method prior to the rate-distortion optimization or decoding process. The IBC-TM merge mode has been put in competition with the regular IBC merge mode and a TM-merge flag is signaled.

In the IBC-TM AMVP mode, up to 3 candidates are selected from the IBC-TM merge list. Each of those 3 selected candidates are refined using the Template Matching method and sorted according to their resulting Template Matching cost. Only the 2 first ones are then considered in the motion estimation process as usual.

Figure 8:
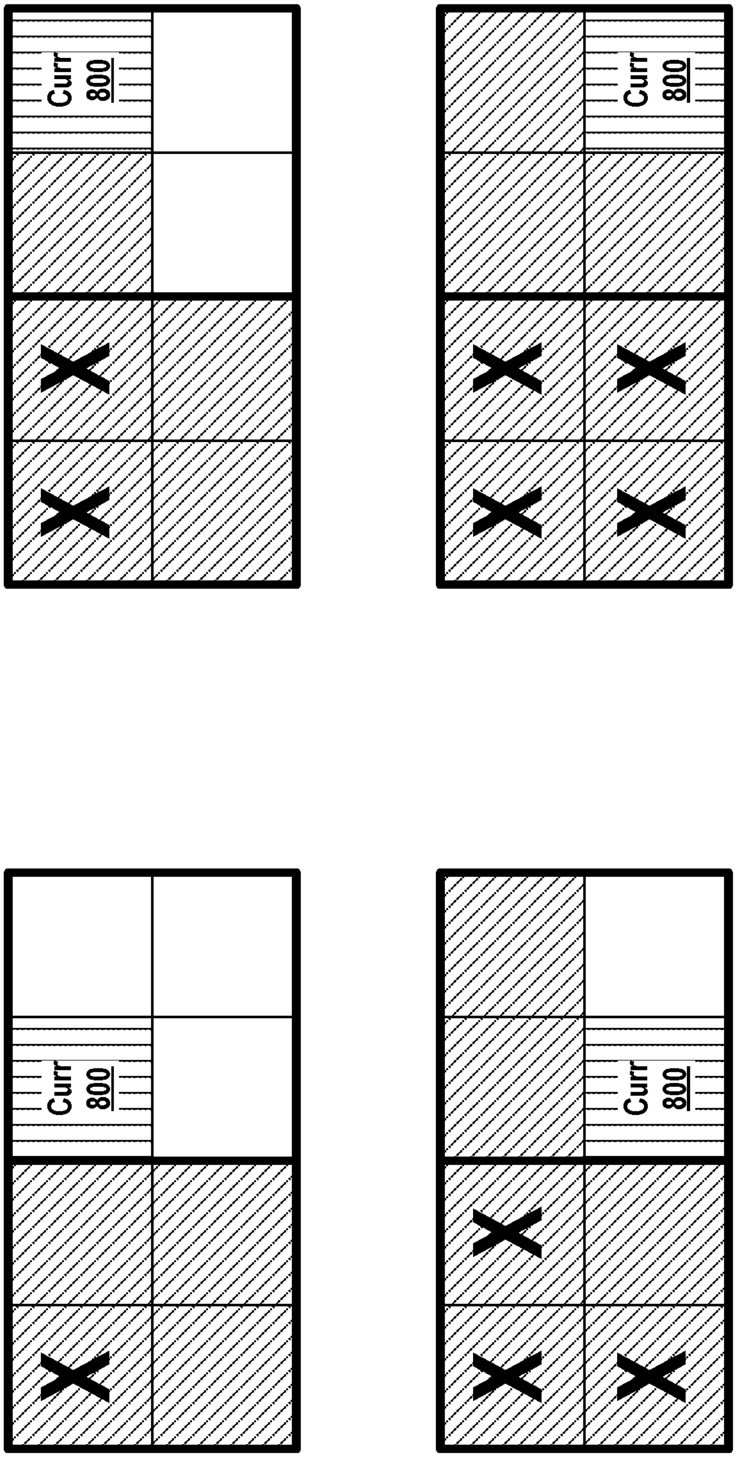
FIG. 8 is a conceptual diagram illustrating intra-block copy reference regions depending on current CU position.
Figure 10:
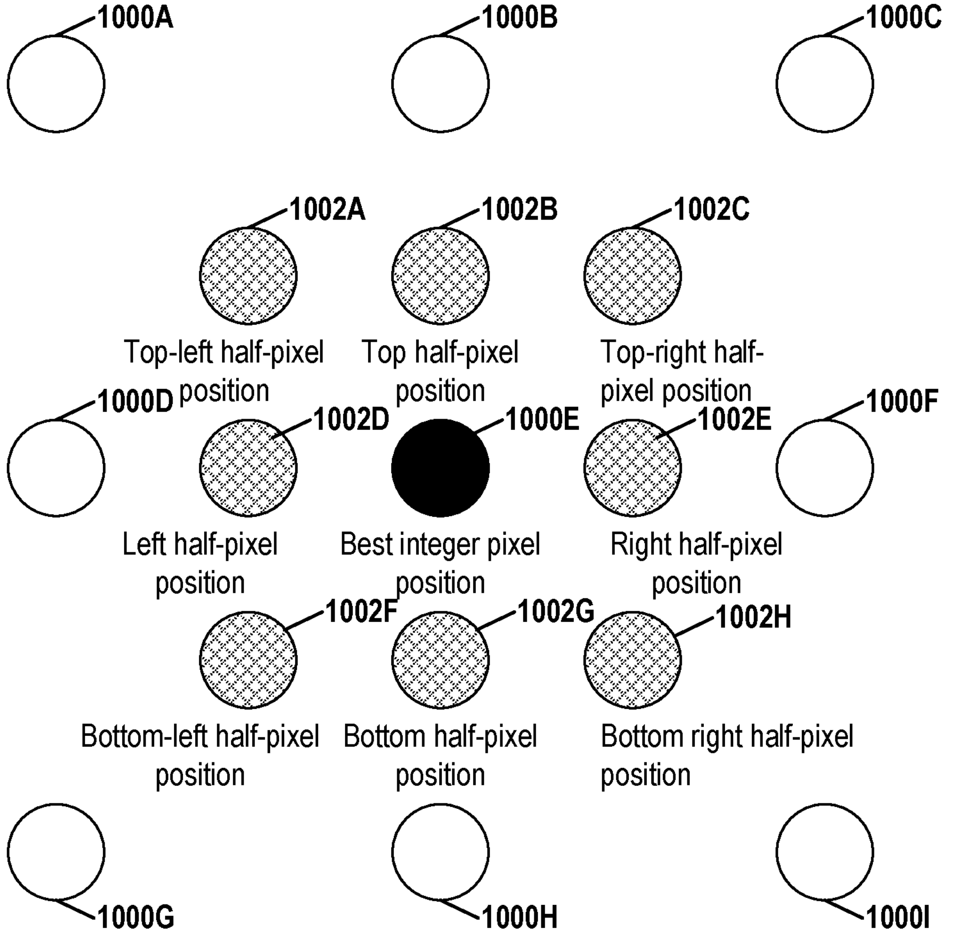
FIG. 10 is a conceptual diagram illustrating a sub-pel precision prediction mode according to techniques of this disclosure.

FIG. 8 is a conceptual diagram illustrating IBC reference regions depending on a position of a current CU 800. The Template Matching refinement for both IBC-TM merge and AMVP modes is quite simple since IBC motion vectors are constrained (i) to be integer and (ii) within a reference region as shown in FIG. 10. So, in IBC-TM merge mode, all refinements are performed at integer precision, and in IBC-TM AMVP mode, they are performed either at integer or 4-pel precision depending on the AMVR value. Such a refinement accesses only to samples without interpolation. In both cases, the refined motion vectors and the used template in each refinement step must respect the constraint of the reference region.

To improve the coding efficiency of template matching, instead of using only one pattern and process of template in TM, template matching could use different template types, store more candidates and apply fusion to combine these different candidates which are found by the different methods.

For description-wise simplicity, if not otherwise stated, the mentioned TM in this disclosure can refer to the Intra template matching, inter template matching, adaptive reordering of merge candidates with template matching (ARMC-TM) or IBC template matching. The disclosed examples and techniques can be used solely or in any combination.

Figure 9:
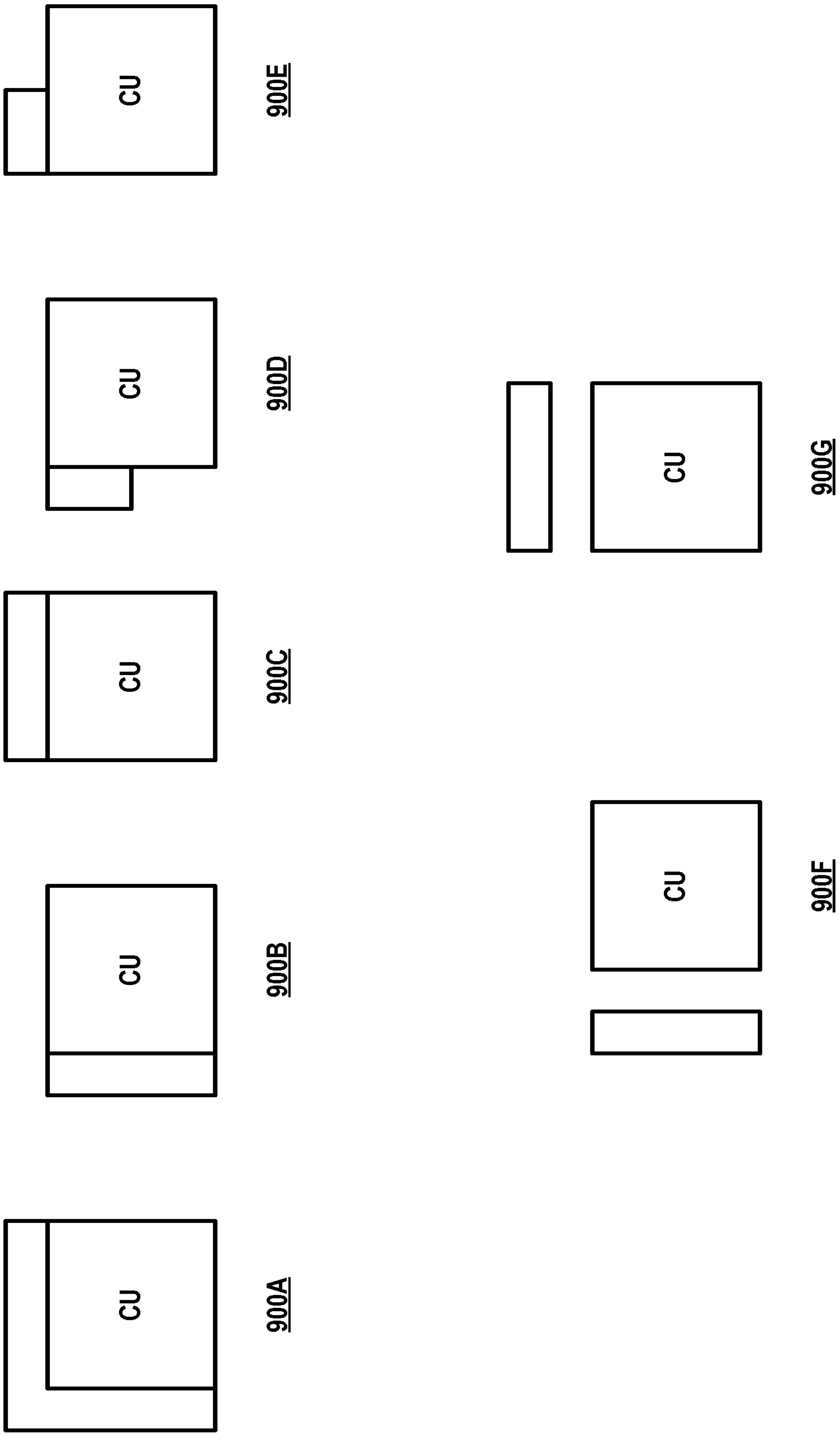
FIG. 9 is a conceptual diagram illustrating different template types according to techniques of this disclosure.

Examples related to multiple template and sub-pel precision in TM are now discussed. In a first example, TM has a template pattern set comprised of multiple template matching patterns, and a syntax element indicates one template pattern used in the template matching process. This syntax element may be signaled in a bitstream by video encoder 200 and obtained from the bitstream by video decoder 300. When template matching is used in the current block and a template matching mode is signaled, the corresponding template pattern of this mode is used in the template matching process. FIG. 9 is a conceptual diagram illustrating different template types according to techniques of this disclosure. Each (or a subset of) the template types 900A-900G (i.e., template patterns) shown in FIG. 9 may be used in this example.

Thus, in some examples, a video coder (e.g., video encoder 200 or video decoder 300) may determine a template pattern from among a plurality of template patterns. The video coder may identify, based on the determined template pattern, a prediction block for a current block of the video data. The video coder may encode or decode the current block using the prediction block. A syntax element may indicate the determined template pattern. As shown in FIG. 9, the plurality of templates may include two or more of: a set of reference samples above and left of the current block, a set of reference samples left of the current block, a set of reference samples above the current block, a subset of reference samples left of the current block, a subset of reference samples above the current block, a set of reference samples left of and non-adjacent to the current block, a set of reference sample above and non-adjacent to the current block. In some examples, the plurality of template patterns includes a base template pattern. The video coder may determine the template pattern from among the base template pattern and one or more of the template patterns that are within an area of the base template pattern.

In a second example, as a simplified method of the aforementioned first example, the template pattern set is composed of three template matching patterns shown in FIG. 9: (Pattern 1) use both above and left neighboring samples, (Pattern 2) only use above neighboring samples, and (Pattern 3) only use left neighboring samples. The matching cost of template matching pattern 1 is derived from the cost of template matching pattern 2 and the cost of template matching pattern 3.

In a third example, as a simplified method of the aforementioned first example, the TM has a base template pattern S. The additional template patterns 1 . . . n are all inside the region of S. For example, if type 900A in FIG. 9 is the base template pattern, types 900B, 900C, 900D and 900E could be other template patterns since they are all inside the region (a). In another example, as a simplified method of the aforementioned first example, the base template pattern could be type 900A in FIG. 9.

In another example, TM has a sub-pel prediction mode that uses interpolation filter to derive a sub-pel precision block vector (BV). FIG. 10 is a conceptual diagram illustrating an example sub-pel precision prediction mode according to techniques of this disclosure. In the example of FIG. 10, circles 1000A-1000I correspond to full-pel samples. Circles 1002A-1002H correspond to half-pel samples.

In another example, there is a flag to indicate that whether the sub-pel precision mode is applied to the current block or not. In another example, the sub-pel precision mode flag is inherited from a neighboring block. In another example, the sub-pel precision mode flag is signaled only when non-fusion TM mode is selected in the current block. Otherwise, the sub-pel precision mode flag is implied to be 0.

In another example, the sub-pel precision mode flag is signaled only when the base template pattern is selected in the current block. Otherwise, the sub-pel precision mode flag is implied to be 0. In other words, a video coder may determine a template pattern from among a plurality of template patterns, where the plurality of template patterns includes a base template pattern. In this example, the video coder may determine the template pattern from among the base template pattern and one or more of the template patterns that are within an area of the base template pattern. The sub-pel precision mode flag is only signaled when the base template pattern is the determined (e.g., selected) template pattern.

In another example, the sub-pel precision mode flag is signaled only when the TM candidate index is equal to 0 in the current block. Otherwise, the sub-pel precision mode flag is implied to be 0. In other words, the syntax element that indicates whether the sub-pel precision mode is applied to the current block is signaled based on the determined template pattern being the base template pattern and not any of the other template patterns.

In another example, the sub-pel precision mode flag is signaled only when the base template pattern is selected and the TM candidate index is equal to 0 in the current block. Otherwise, the sub-pel precision mode flag is implied to be 0. Thus, in this example, a video coder may generate a list of template matching candidates. Each of the template matching candidates is associated with a different motion vector. In this example, the video coder may select a template matching candidate from the list of template matching candidates. Based on the selected template matching candidate having a template matching candidate index equal to 0 and the determined template pattern being the base template pattern and not any of the other template patterns, a syntax element indicates whether the sub-pel precision mode is applied to the current block.

In another example, the sub-pel precision mode flag is signaled only when the TM candidate index is smaller than M whereas the number of TM candidates is N and M<N in the current block. Otherwise, the sub-pel precision mode flag is implied to be 0. In other words, a video coder may generate a list of template matching candidates, where each of the template matching candidates is associated with a different motion vector. The video coder may select a template matching candidate from the list of template matching candidates. Based on the selected template matching candidate having a template matching candidate index smaller than a predetermined value (M), a syntax element indicates whether the sub-pel precision mode is applied to the current block. The predetermined value is smaller than a quantity of template matching candidates in the list (N).

In another example, the sub-pel precision mode flag is signaled only when the base template pattern is selected and the TM candidate index is smaller than M whereas the number of TM candidates is N and M<N in the current block. Otherwise, the sub-pel precision mode flag is implied to be 0. In other words, a video coder may generate a list of template matching candidates. Each of the template matching candidates is associated with a different motion vector. The video coder may select a template matching candidate from the list of template matching candidates. Based on the selected template matching candidate having a template matching candidate index smaller than a predetermined value (M) and the determined template pattern being the base template pattern and not any of the other template patterns, a syntax element indicates whether the sub-pel precision mode is applied to the current block. The predetermined value (M) is smaller than a quantity of template matching candidates (N) in the list.

In another example, if the sub-pel precision mode is used, the signaled available TM candidates is reduced to M whereas the original signaled available TM candidates which the sub-pel precision mode is not used is N and M<N in the current block. In other words, the video coder may generate a list of template matching candidates, where each of the template matching candidates is associated with a different motion vector. The video coder may select a template matching candidate from the list of template matching candidates. Based on the sub-pel precision mode being used to encode or decode the current block, the list of template matching candidates is reduced relative to when the sub-pel precision mode is not used.

In another example, if the sub-pel precision mode is used, the TM candidate index is not signaled and is implied to be 0. In other words, the video coder may generate a list of template matching candidates. Each of the template matching candidates is associated with a different motion vector. The video coder may select a template matching candidate from the list of template matching candidates. Based on the sub-pel precision mode being used for encoding or decoding the current block, a template matching candidate index of the selected template matching candidate is not signaled.

In another example, if the sub-pel precision mode is used, the template pattern is not signaled and is implied to be the base template pattern. In other words, based on the sub-pel precision mode being used to encode or decode the current block, a syntax element that indicates the selected template pattern is not signaled.

In another example, if the sub-pel precision mode is used, the TM fusion mode flag is not signaled and the TM fusion mode is implied to be non-fusion mode. In other words, based on the sub-pel precision model being used for encoding or decoding the current block, a template matching fusion mode flag is not signaled, where the template matching fusion mode flag indicates whether or not TM fusion mode is applied.

In another example, the syntax of matching pattern is signaled in the CU, PU, CTU, slice, or picture level. In other words, an index of the determined template pattern is signaled at one of: a CU level, a PU level, a CTU level, a slice level, or a picture level.

In some examples, the sub-pel precision is half pixel. In some examples, the sub-pel precision is quarter pixel. In some examples, another flag signaled in a bitstream or obtained from the bitstream indicates whether the sub-pel precision is half pixel or quarter pixel. In other words, a syntax element is signaled (e.g., by video encoder 200) that specifies whether the sub-pel precision is half pixel or quarter pixel.

Examples related to fusion mode reordering and weight selection are now discussed. In one example, the prediction block for the current block may be generated from a combination of k TM candidates, the k is larger than 1. The k TM candidates can be arbitrarily selected from the available candidate lists of different template patterns or same pattern. For one example, a 2-candidate fusion can combine the smallest and third smallest cost candidates of template pattern A. For another example, a 3-candidate fusion can combine the second smallest candidate of template pattern A, second smallest candidate of template pattern B and the smallest candidate of template pattern C.

In another example, a video coder may generate a prediction block (e.g., a prediction block for the current block, a prediction block for a fusion mode, etc.) from a combination of k TM candidates. A prediction block generated from a combination of TM candidates may be more similar to the current block than a prediction block generated from a single TM candidate, which may result in greater coding efficiency. In one example, a linear combination may be used. In other words, a video coder may generate a prediction block as a linear combination of corresponding samples in the reference blocks associated with two or more TM candidates. Corresponding samples are samples in corresponding positions within the reference blocks. The 0 to k candidates could be selected from 0 to N candidates from template matching. The combination can be formulated as follows:

$$P_{(x,y)} = \frac{(w_0 * P_{0(x,y)} + w_1 * P_{1(x,y)} + \cdots + w_k * P_{k(x,y)})}{(w_0 + w_1 + \cdots + w_k)}$$

where $P_0 \ldots P_k$ are the selected k candidates derived from TM process and $w_0 \ldots w_k$ are the weighting used for each candidate. Thus, in some examples, a video coder may generate a plurality of template matching (TM) candidates. Each of the TM candidates is associated with a respective prediction block and a respective motion vector predictor. As part of generating the plurality of TM candidates, for each of the TM candidates, the video coder may apply an interpolation filter to samples of a reference region indicated by the motion vector predictor associated with the TM candidate to generate a respective array of samples at full-pel and sub-pel precision. The video coder may identify, within the respective array, a respective reference template of the respective prediction block. The respective reference template of the respective prediction block is a best match for the template of the current block within the respective array. The video coder may generate, based on a combination of two or more of the respective prediction blocks associated with two or more of the TM candidates, the prediction block for the current block. The video coder may generate the prediction block for the current block as a linear combination of corresponding samples in the prediction blocks associated with two or more TM candidates of the plurality of TM candidates.

In some examples, the combined weight $w_k$ may be derived based on the template matching cost. For instance, for each of the two or more TM candidates, the video coder may calculate a template cost for the TM candidate and may generate the prediction block for the current block as a weighted average of the samples in the two or more template candidates. The weights used in the weighted average are based on the template costs for the TM candidates. In one example, the weights are the multiplicative inverse of the template matching cost of this candidate k. The weights are multiplicative inverses of template matching costs for the TM candidates.

In some examples, the weights are derived based on the sum of absolute differences (SAD), mean square error (MSE), MSE minimization, or block vector (BV). In other words, the video coder may derive weights based on one or more of a SAD, MSE, MSE minimization, or BV of the two or more TM candidates. The video coder may generate the prediction block for the current block as a weighted average of the corresponding samples in the two or more template candidates. Weights used in the weighted average are based on the template costs for the TM candidates.

In another example, the candidates used in combination can be selected based on the SAD, MSE or block vector (BV) of available candidates. In other words, the video coder may derive a SAD, MSE, or BV of the TM candidates. The video coder may select the two or more TM candidates based on one or more of the SAD, MSE, or BV of the TM candidates.

In another example, a flag indicates the method to derive the weights from a set of deriving methods. In other words, the video coder may determine a weight derivation method from among a plurality of weight derivation methods. For instance, video encoder 200 may perform a rate-distortion optimization process to determine the weight derivation method from among the plurality of weight derivation methods. Video decoder 300 may determine the weight derivation method based on a syntax element signaled in a bitstream. The video coder may apply the weight derivation method to derive weights of the two or more TM candidates. As part of generating a prediction block (e.g., a prediction block for a current block), the video coder may generate the prediction block as a weighted average of the corresponding samples in the prediction blocks associated with the two or more TM candidates using the weights of the two or more TM candidates. A syntax element (e.g., flag) indicates the weight derivation method. In another example, a flag indicates whether the weights are derived based on the template cost or based on the MSE minimization. Video encoder 200 may signal the syntax elements in a bitstream and video decoder 300 may obtain the syntax elements from the bitstream. Determining the weight derivation method in this way may reduce differences between the prediction block for the current block and the current block itself, which may improve coding efficiency.

In another example, there are multiple modes of combination can be selected and signaled, a fusion list is constructed to indicate the candidates of fusion for the current block. The fusion list includes a list of fusion modes, each of which is associated with a different combination of two or more TM candidates. In other words, a video coder may select and signal multiple modes of combination, and the video coder may construct a fusion list to indicate the candidates of fusion for the current block.

In another example, the number of signaled fusion modes is M and the number of available fusion modes is N where M<N. To select the M modes from N modes, the combination will be applied to the template of all candidates and the combined template cost is calculated for each of the N modes. The M modes with the minimum combined template cost will be selected. Using a reduced number of the available fusion modes may reduce the amount of work that video decoder 300 may need to perform to determine the fusion mode.

Thus, in this example, a quantity of signaled fusion modes is M and a quantity of available fusion modes is N where M<N. The video coder may select the M fusion modes from N fusion modes. To select the M fusion modes, the video coder may calculate a combined template cost for each of the N fusion modes. Each of the N fusion modes is a combination of two TM candidates. The video coder may select the M modes with the minimum combined template cost. The video coder may select the two or more TM candidates from among the M fusion modes, where the two or more TM candidates are used to generate the prediction block for the current block. Stated in another way, each fusion mode of a plurality of available fusion modes is associated with a different combination of two or more TM candidates in a plurality of TM candidates, a bitstream indicates a subset of the available fusion modes, a quantity of fusion modes in the subset is M, a quantity of the available fusion modes is N, where M<N, the fusion modes in the subset of available fusion modes have minimum combined template costs among the available fusion modes. As part of applying the sub-pel precision mode, the video coder may, for each fusion mode of the subset of the available fusion modes, for each TM candidate of the two or more TM candidates associated with the fusion mode: apply the interpolation filter to samples of a reference region indicated by a motion vector predictor associated with the TM candidate to generate a respective array of samples at full-pel and sub-pel precision. The video coder may identify, within the respective array, a respective reference template of a respective prediction block for the TM candidate. The respective reference template of the respective prediction block is a best match for the template of the current block within the respective array. The video coder may generate, based on a combination of the respective prediction blocks for the two or more TM candidates associated with the fusion mode, a prediction block for the fusion mode. The video coder may determine the prediction block for the current block from among the prediction blocks for the fusion modes.

In another example, for each fusion mode, there are multiple weighting sets that can be selected. To select the weighting set for a fusion mode, the combination with each weighting set will be applied to the template and the combined template cost is calculated. The weighting set with the minimum combined template cost will be selected. Thus, in some examples, each fusion mode of a plurality of fusion modes is associated with a different combination of two or more TM candidates in a plurality of TM candidates. As part of applying the sub-pel precision mode, the video coder may, for each fusion mode of the plurality of fusion modes, and for each TM candidate of the two or more TM candidates associated with the fusion mode, apply the interpolation filter to samples of a reference region indicated by a motion vector predictor associated with the TM candidate to generate a respective array of samples at full-pel and sub-pel precision. The video coder may identify, within the respective array, a respective reference template of a respective prediction block for the TM candidate. The respective reference template of the respective prediction block for the TM candidate may be a best match for the template of the current block within the respective array. For each respective weighting set of a plurality of weighting sets, the video coder may generate a prediction block for the respective weighting set as a weighted average of samples in the prediction blocks of the two or more TM candidates associated with the fusion mode. Weights used in the weighted average are included in the respective weighting set. The video coder may calculate a combined template cost of the prediction block for the respective weighting set. The video coder may select a weighting set for the fusion mode from among the plurality of weighting sets based on a minimum of the combined template cost of the prediction blocks for the weighting sets. The video coder may determine the prediction block for the current block from among the prediction blocks for the selected weighting sets for the plurality of fusion modes.

In another example, the weights are derived by using MSE minimization. In the training phase, the weights are derived to minimize the MSE between the linear combination of the templates of the k candidates and the template of current block. Thus, in some examples, the video coder may generate a prediction block as a weighted average of samples in the two or more template candidates. A training process may train the weights used in the weighted average to minimize mean squared error between linear combinations of templates of training TM candidates and templates of training blocks. In some examples, the video coder or another computing system may derive the weights after determining which TM candidates are fused. After deriving the weights, the video coder may apply the candidates and generate the prediction block.

In another example, the location information x, y, or both x and y is used as the input parameters in the interpolation filter. Thus, a video coder may use location information as input parameters in filtering the prediction block for the current block. For example, the filtering function can be Pred(x, y)=w0*x+w1*y+w2*Ref(x, y), where x and y are the relative position of the current block and reference block, respectively. The reason for including x and y is to catch the position-related change of the content.

In another example, the multi-model filter parameters are used in the linear combination of the k candidates. In other words, a video coder may generate the prediction block as a linear combination of samples in the reference blocks associated with the two or more TM candidates. The video coder may use a multi-model filter on the linear combination of the k candidates.

In another example, the difference between the pixel values of the candidates is used to select one of the multi-model filters. In other words, the video coder may use a difference between the pixel values of the candidates to select the multi-model filter.

In another example, the location information x, y, or both x and y is used to select one of the multi-model filters. In other words, the video coder may use location information to select the multi-model filters.

Examples related to spatial filtering on fused mode are now discussed. In some examples, the prediction block for the current block may be generated from a combination of k candidates, where k is larger than 1. The k candidates can be arbitrarily selected from the available candidate lists of different template patterns or same pattern. the combining weight $w_k$ could be derived based on the template matching cost, SAD, MSE, or block vector (BV). A spatial filter is further applied to the fused block.

In another example, the spatial filter is a six-tap filter, including current pixel value, the above pixel value, the left pixel value, the right pixel value, the below pixel value, and a bias term.

In another example, the spatial filter includes the location information, such as the position x, y, or both x and y.

In another example, the multi-model spatial filter is used. In other words, the video coder may use a difference between a pixel value of a current pixel and a pixel value of a neighboring pixel to select one of the spatial filter.

In another example, the difference between the pixel value of current pixel and the pixel value of a neighboring pixel is used to select one of the multi-model filters. In other words, the video coder may use a pixel value of a current pixel and a mean of pixel values to select the spatial filter.

In another example, the pixel value of current pixel and the mean of pixel values are used to select one of the multi-model filters.

In another example, a flag indicates whether the spatial filter is applied on the fused mode. Video encoder 200 may signal the flag in a bitstream and video decoder 300 may obtain the flag from the bitstream.

In another example, a flag used to decide whether the spatial filter is applied is inherited from a neighboring block. Video encoder 200 may signal the flag in a bitstream and video decoder 300 may obtain the flag from the bitstream.

In another example, a flag indicates whether the spatial filter is applied only when the fused mode use MSE minimization to derive the weights. Otherwise, the spatial filter is implied to be non-applied. Video encoder 200 may signal the flag in a bitstream and video decoder 300 may obtain the flag from the bitstream. Thus, a video coder may determine samples of a prediction block based on weighted averages of corresponding samples of the two or more TM candidates, wherein weighted averages use the derived weights.

Figure 11:
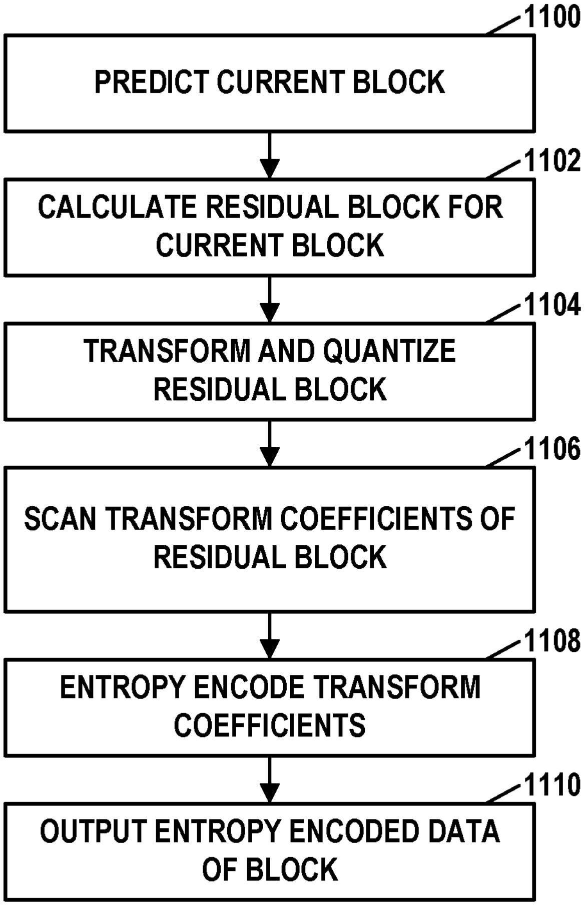
FIG. 11 is a flowchart illustrating an example method for encoding a current block in accordance with the techniques of this disclosure.

FIG. 11 is a flowchart illustrating an example method for encoding a current block in accordance with the techniques of this disclosure. The current block may be or include a current CU. Although described with respect to video encoder 200 (FIGS. 1 and 2), it should be understood that other devices may be configured to perform a method similar to that of FIG. 11.

In this example, video encoder 200 initially predicts the current block (1100). For example, video encoder 200 may form a prediction block for the current block. In accordance with one or more techniques of this disclosure, video encoder 200 may apply a sub-pel precision mode to generate the prediction block. Video encoder 200 may signal a syntax element to indicate that the sub-pel precision mode is applied to the current block. As part of applying the sub-pel precision mode, video encoder 200 may apply an interpolation filter to samples of a reference region to generate an array of samples at full-pel and sub-pel precision. Video encoder 200 may identify, within the array, a reference template of the prediction block. The reference template of the prediction block may be a best match for a template of the current block within the array. A template pattern defines a shape of the reference template of the prediction block and the template of the current block.

Video encoder 200 may then calculate a residual block for the current block (1102). To calculate the residual block, video encoder 200 may calculate a difference between the original, unencoded block and the prediction block for the current block. Video encoder 200 may then transform the residual block and quantize transform coefficients of the residual block (1104). Next, video encoder 200 may scan the quantized transform coefficients of the residual block (1106). During the scan, or following the scan, video encoder 200 may entropy encode the transform coefficients (1108). For example, video encoder 200 may encode the transform coefficients using CAVLC or CABAC. Video encoder 200 may then output the entropy encoded data of the block (1110).

Figure 12:
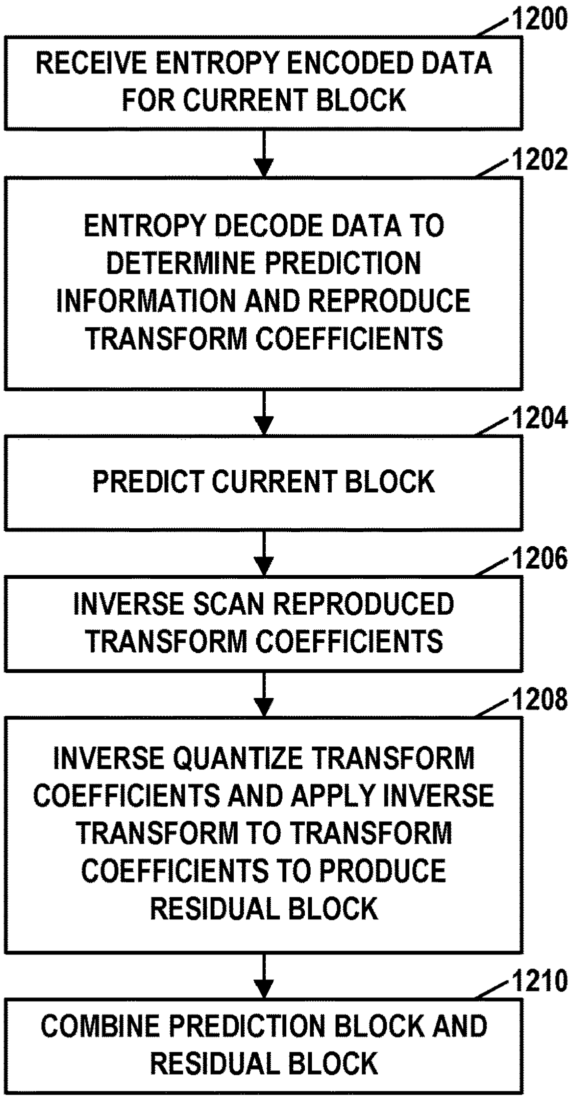
FIG. 12 is a flowchart illustrating an example method for decoding a current block in accordance with the techniques of this disclosure.

FIG. 12 is a flowchart illustrating an example method for decoding a current block of video data in accordance with the techniques of this disclosure. The current block may be or include a current CU. Although described with respect to video decoder 300 (FIGS. 1 and 3), it should be understood that other devices may be configured to perform a method similar to that of FIG. 12.

Video decoder 300 may receive entropy encoded data for the current block, such as entropy encoded prediction information and entropy encoded data for transform coefficients of a residual block corresponding to the current block (1200). Video decoder 300 may entropy decode the entropy encoded data to determine prediction information for the current block and to reproduce transform coefficients of the residual block (1202).

Video decoder 300 may predict the current block (1204), e.g., using an intra- or inter-prediction mode as indicated by the prediction information for the current block, to calculate a prediction block for the current block. In accordance with one or more techniques of this disclosure, video decoder 300 may apply a sub-pel precision mode to generate the prediction block. A syntax element indicates that the sub-pel precision mode is applied to the current block. Video decoder 300 may obtain the flag from the bitstream. As part of applying the sub-pel precision mode, video decoder 300 may apply an interpolation filter to samples of a reference region to generate an array of samples at full-pel and sub-pel precision. Video decoder 300 may identify, within the array, a reference template of the prediction block. The reference template of the prediction block may be a best match for a template of the current block within the array. A template pattern defines a shape of the reference template of the prediction block and the template of the current block.

Video decoder 300 may then inverse scan the reproduced transform coefficients (1206), to create a block of quantized transform coefficients. Video decoder 300 may then inverse quantize the transform coefficients and apply an inverse transform to the transform coefficients to produce a residual block (1208). Video decoder 300 may ultimately decode the current block by combining the prediction block and the residual block (1210).

Figure 13:
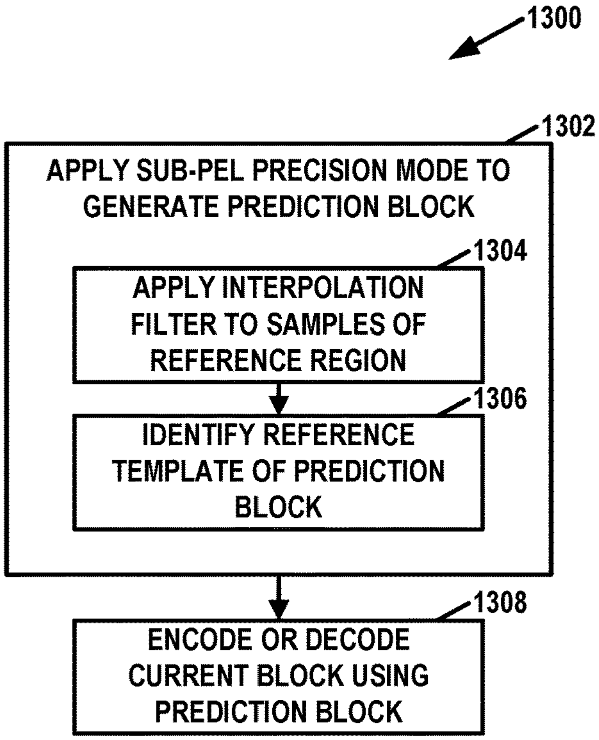
FIG. 13 is a flowchart illustrating an example operation of a video coder according to techniques of this disclosure.

FIG. 13 is a flowchart illustrating an example operation 1300 of a video coder according to techniques of this disclosure. Operation 1300 may be performed by video encoder 200 or video decoder 300. In the example of FIG. 13, the video coder may apply a sub-pel precision mode to generate a prediction block for a current block of the video data (1302). In some examples, a syntax element indicates whether the sub-pel precision mode is applied to the current block. Video encoder 200 may signal the flag in a bitstream and video decoder 300 may obtain the flag from the bitstream. The syntax element may be signaled based on a non-fusion template matching mode being used for the current block. In some examples, based on the sub-pel precision mode being used to generate the prediction block for the current block, a template matching fusion mode flag is not signaled. In the examples of FIG. 2 and FIG. 3, TM unit 228 or TM unit 322 may apply the sub-pel precision mode to generate the prediction block for the current block.

As part of applying the sub-pel precision mode, the video coder may apply an interpolation filter to samples of a reference region to generate an array of samples at full-pel and sub-pel precision (1304). In some examples, the sub-pel precision is quarter pixel precision. In other examples, the sub-pel precision may be different, such as half-pel, ⅛-pel, and so on.

The video coder may identify, within the array, a reference template of the prediction block, wherein the reference template of the prediction block is a best match for a template of the current block within the array (1306). A template pattern defines a shape of the reference template of the prediction block and the template of the current block. prediction block for a current block of the video data. Thus, the video coder may search the array for a reference template having the closest match to a current template. The reference template and the current template have a shape defined by the template pattern and the current template includes samples neighboring the current block.

In some examples, the video coder generates a list of template matching candidates. Each of the template matching candidates is associated with a different motion vector. The video coder may select a template matching candidate from the list of template matching candidates. Based on the sub-pel precision mode being used to generate the prediction block for the current block, the list of template matching candidates may be reduced relative to when the sub-pel precision mode is not used.

In some examples, the video coder uses a fusion of two or more blocks of reference samples to generate the prediction block for the current block. In such examples, the video coder may generate a plurality of TM candidates. Each of the TM candidates is associated with a respective prediction block and a respective motion vector predictor. As part of generating the plurality of TM candidates, the video coder may, for each of the TM candidates, apply the interpolation filter to samples of a reference region indicated by the motion vector predictor associated with the TM candidate to generate a respective array of samples at full-pel and sub-pel precision. The video coder may identify, within the respective array, a respective reference template of the respective prediction block. The respective reference template of the respective prediction block may be a best match for the template of the current block within the respective array. The video coder may generate, based on a combination of two or more of the respective prediction blocks associated with the TM candidates, the prediction block for the current block.

The video coder may encode or decode the current block using the prediction block for the current block (1308). For instance, in an example where the video coder is video encoder 200, video encoder 200 may generate residual data based on the prediction block for the current block, apply a transform to the residual data to generate transform coefficients, quantize the transform coefficients, and entropy encode syntax elements representing the quantized transform coefficients. In an example where the video coder is video decoder 300, video decoder 300 may reconstruct samples of the current block based on the prediction block and residual data.

The following numbered clauses illustrate one or more aspects of the devices and techniques described in this disclosure.

Clause 1A. A method of encoding or decoding video data, the method comprising: determining a template pattern from among a plurality of template patterns; identifying, based on the determined template pattern, a prediction block for a current block of the video data; and encoding or decoding the current block using the prediction block, wherein a syntax element is signaled to indicate the determined template pattern.

Clause 2A. The method of clause 1A, wherein the plurality of templates include two or more of: a set of reference samples above and left of the current block, a set of reference samples left of the current block, a set of reference samples above the current block, a subset of reference samples left of the current block, a subset of reference samples above the current block, a set of reference samples left of and non-adjacent to the current block, a set of reference sample above and non-adjacent to the current block.

Clause 3A. The method of any of clauses 1A-2A, wherein: the plurality of template patterns includes a base template pattern, and determining the template pattern comprises determining the template pattern from among the base template pattern and one or more of the template patterns that are within an area of the base template pattern.

Clause 1B. A method of encoding or decoding video data, the method comprising: applying a sub-pel precision mode to generate a prediction block for a current block of the video data, wherein applying the sub-pel precision mode comprises: applying an interpolation filter to samples of a reference region to generate a reference region that includes an array of samples at full-pel and sub-pel precision; and using a template pattern to identify, within the array, a prediction block for a current block of the video data, wherein a block vector indicating a displacement between the current block and the prediction block has sub-pel accuracy; and encoding or decoding the current block using the prediction block.

Clause 2B. The method of clause 1B, wherein a syntax element is signaled to indicate whether sub-pel precision mode is applied to the current block.

Clause 3B. The method of clause 2B, wherein the syntax element is signaled based on a non-fusion template matching mode being used for the current block.

Clause 4B. The method of clause 1B, further comprising inheriting a sub-pel precision model flag from a block that neighbors the current block.

Clause 5B. The method of any of clauses 1B-4B, wherein the method further comprises determining the template pattern from among a plurality of template patterns.

Clause 6B. The method of clause 5B, wherein: the plurality of template patterns includes a base template pattern, and determining the template pattern comprises determining the template pattern from among the base template pattern and one or more of the template patterns that are within an area of the base template pattern.

Clause 7B. The method of clause 6B, wherein a syntax element is signaled to indicate whether the sub-pel precision mode is applied to the current block based on the determined template pattern being the base template pattern and not any of the other template patterns.

Clause 8B. The method of clause 6B, further comprising: generating a list of template matching candidates, wherein each of the template matching candidates is associated with a different motion vector; selecting a template matching candidate from the list of template matching candidates, wherein based on the selected template matching candidate having a template matching candidate index equal to 0 and the determined template pattern being the base template pattern and not any of the other template patterns, a syntax element is signaled to indicate whether the sub-pel precision mode is applied to the current block.

Clause 9B. The method of clause 6B, wherein, based on the sub-pel precision mode being used to encode the current block, a syntax element that indicates the selected template pattern is not signaled.

Clause 10B. The method of any of clauses 1B-9B, further comprising: generating a list of template matching candidates, wherein each of the template matching candidates is associated with a different motion vector; and selecting a template matching candidate from the list of template matching candidates, wherein, based on the selected template matching candidate having a template matching candidate index equal to a predetermined value smaller than a quantity of template matching candidates in the list and the determined template pattern being the base template pattern and not any of the other template patterns, a syntax element is signaled to indicate whether the sub-pel precision mode is applied to the current block.

Clause 11B. The method of any of clauses 1B-10B, further comprising: generating a list of template matching candidates, wherein each of the template matching candidates is associated with a different motion vector; and selecting a template matching candidate from the list of template matching candidates, wherein, based on the selected template matching candidate having a template matching candidate index equal to 0, a syntax element is signaled to indicate whether the sub-pel precision mode is applied to the current block.

Clause 12B. The method of any of clauses 1B-11B, further comprising: generating a list of template matching candidates, wherein each of the template matching candidates is associated with a different motion vector; and selecting a template matching candidate from the list of template matching candidates, wherein, based on the selected template matching candidate having a template matching candidate index equal to a predetermined value smaller than a quantity of template matching candidates in the list, a syntax element is signaled to indicate whether the sub-pel precision mode is applied to the current block.

Clause 13B. The method of any of clauses 1B-12B, further comprising: generating a list of template matching candidates, wherein each of the template matching candidates is associated with a different motion vector; selecting a template matching candidate from the list of template matching candidates; and wherein based on the sub-pel precision mode being used to encode the current block, the list of template matching candidates is reduced relative to when the sub-pel precision mode is not used.

Clause 14B. The method of any of clauses 1B-13B, further comprising: generating a list of template matching candidates, wherein each of the template matching candidates is associated with a different motion vector; and selecting a template matching candidate from the list of template matching candidates, wherein, based on the sub-pel precision mode being used for encoding the current block, a template matching candidate index of the selected template matching candidate is not signaled.

Clause 15B. The method of any of clauses 1B-14B, wherein, based on the sub-pel precision model being used for encoding the current block, a template matching fusion mode flag is not signaled.

Clause 16B. The method of any of clauses 1A-15B, wherein an index of the determined template pattern is signaled at one of: a coding unit (CU) level, a prediction unit (PU) level, a coding tree unit (CTU) level, a slice level, or a picture level.

Clause 17B. The method of any of clauses 1B-16B, wherein the sub-pel precision is one of half pixel or quarter pixel.

Clause 18B. The method of clause 17B, further comprising signaling a syntax element that specifies whether the sub-pel precision is half pixel or quarter pixel.

Clause 1C. A method of encoding or decoding video data, the method comprising: generating template matching (TM) candidates, wherein each of the TM candidates is associated with a different reference block; generating, based on a combination of two or more of the TM candidates, a predictor for a current block of the video data; and encoding or decoding the current block using the predictor.

Clause 2C. The method of clause 1C, further comprising: evaluating costs of reference blocks associated with the TM candidates based on two or more template patterns; and selecting the two or more TM candidates based on the costs.

Clause 3C. The method of any of clauses 1C-2C, wherein generating the predictor comprises generating the predictor as a linear combination of samples in the reference blocks associated with the two or more TM candidates.

Clause 4C. The method of clause 3C, wherein generating the predictor as the linear combination of the samples comprises: for each of the two or more TM candidates, calculating a template cost for the template pattern candidate, and generating the predictor as a weighted average of the samples in the two or more template candidates, wherein weights used in the weighted average are based on the template matching costs for the template pattern candidates.

Clause 5C. The method of clause 3C, wherein generating the predictor as the linear combination of the samples comprises: deriving weights based on one or more of a sum of absolute differences (SAD), mean squared error (MSE), MSE minimization, or block vector (BV) of the two or more TM candidates, and generating the predictor as a weighted average of the samples in the two or more template candidates, wherein weights used in the weighted average are based on the template matching costs for the TM candidates.

Clause 6C. The method of any of clauses 3C-5C, wherein generating the predictor as the linear combination of the samples comprises: determining a weight derivation method from among a plurality of weight derivation methods; applying the weight derivation method to derive weights of the two or more TM candidates; and generating the predictor as a weighted average of the samples in the two or more TM candidates, wherein weights used in the weighted average are based on the template matching costs for the template pattern candidates, wherein a syntax element is signaled to indicate the determined weight derivation method.

Clause 7C. The method of any of clauses 1C-6C, further comprising: deriving a sum of absolute differences (SAD), mean squared error (MSE), MSE minimization, or block vector (BV) of the template pattern candidates, and selecting the two or more template pattern candidates based on one or more of the SAD, MSE, MSE minimization, or BV of the template pattern candidates.

Clause 8C. The method of any of clauses 1C-7C, wherein a flag is signaled to indicate whether the weights are derived based on the template cost or based on the MSE minimization.

Clause 9C. The method of any of clauses 1C-8C, wherein multiple modes of combination can be selected and signaled, the method further comprising constructing a fusion list to indicate the candidates of fusion for the current block.

Clause 10C. The method of any of clauses 1-C-9C, wherein a quantity of signaled fusion modes is M and a quantity of available fusion modes is N where $M<N$, selecting select the M fusion modes from N fusion modes; applying the combination to the template of all of the TM candidates; calculating a combined template cost for each of the N fusion modes; selecting the M modes with the minimum combined template cost.

Clause 11C. The method of any of clauses 1C-10C, wherein: the method comprises, for each fusion mode of a plurality of fusion modes, selecting multiple weighting sets, wherein selecting the weighting set comprises: applying a combination with each weighting set to the template and calculating a combined template cost; and selecting a weighting set with a minimum combined template cost; generating the predictor as a weighted average of samples in the two or more template candidates, wherein weights used in the weighted average are included in the weighting set.

Clause 12C. The method of any of clauses 1C-11C, further comprising: training weights to minimize MSE between linear combinations of the templates of the k candidates and the template of current block; generating the predictor as a weighted average of samples in the two or more template candidates, wherein weights used in the weighted average are included in the weighting set.

Clause 13C. The method of any of clauses 1C-12C, further comprising using location information as input parameters in filtering the predictor.

Clause 14C. The method of any of clauses 1C-13C, wherein: generating the predictor as a linear combination of samples in the reference blocks associated with the two or more TM candidates, and the method further comprising using a multi-model filter on the linear combination of the k candidates.

Clause 15C. The method of clause 14C, further comprising using a difference between the pixel values of the candidates to select the multi-model filter.

Clause 16C. The method of clause 14C, further comprising using location information to select the multi-model filters.

Clause 17C. The method of any of clauses 1C-16C, further comprising applying a spatial filter to the predictor.

Clause 18C. The method of clause 17C, wherein the spatial filter is a 6-tap filter.

Clause 19C. The method of any of clauses 17C-18C, wherein the spatial filter includes location information.

Clause 20C. The method of any of clauses 17C-19C, further comprising using a difference between a pixel value of a current pixel and a pixel value of a neighboring pixel to select one of the spatial filter.

Clause 21C. The method of any of clauses 17C-20C, further comprising using a pixel value of a current pixel and a mean of pixel values to select the spatial filter.

Clause 22C. The method of any of clauses 17C-21C, wherein a flag is signaled to indicate whether the spatial filter is applied to the predictor.

Clause 23C. The method of any of clauses 17C-22C, wherein a flag used to decide whether the spatial filter is applied to the predictor is inherited from a neighboring block.

Clause 24C. The method of any of clauses 17C-23C, wherein: a flag is signaled to indicate whether the spatial filter is applied to the predictor only when a fused mode uses mean square error MSE minimization to derive weights, and wherein generating the predictor comprises determining samples of the predictor based on weighted averages of corresponding samples of the two or more TM candidates, wherein weighted averages use the derived weights.

Clause 25C. A combination of any of the methods of any of clauses 1A-24C.

Clause 1D. A device for coding video data, the device comprising one or more means for performing the method of any of the method clauses listed above.

Clause 2D. The device of clause 1D, wherein the one or more means comprise one or more processors implemented in circuitry.

Clause 3D. The device of any of clauses 1D and 2D, further comprising a memory to store the video data.

Clause 4D. The device of any of clauses 1D-3D, further comprising a display configured to display decoded video data.

Clause 5D. The device of any of clauses 1D-4D, wherein the device comprises one or more of a camera, a computer, a mobile device, a broadcast receiver device, or a set-top box.

Clause 6D. The device of any of clauses 1D-5D, wherein the device comprises a video decoder.

Clause 7D. The device of any of clauses 1D-6D, wherein the device comprises a video encoder.

Clause 8D. A computer-readable storage medium having stored thereon instructions that, when executed, cause one or more processors to perform the method of any of the method clauses listed above.

Clause 1E. A method of encoding or decoding video data, the method comprising: applying a sub-pel precision mode to generate a prediction block for a current block of the video data, wherein a syntax element indicates that the sub-pel precision mode is applied to the current block and applying the sub-pel precision mode comprises: applying an interpolation filter to samples of a reference region to generate an array of samples at full-pel and sub-pel precision; and identifying, within the array, a reference template of the prediction block, wherein the reference template of the prediction block is a best match for a template of the current block within the array, wherein a template pattern defines a shape of the reference template of the prediction block and the template of the current block; and encoding or decoding the current block using the prediction block for the current block.

Clause 2E. The method of clause 1E, wherein the syntax element is signaled based on a non-fusion template matching mode being used for the current block.

Clause 3E. The method of any of clauses 1E-2E, further comprising: generating a list of template matching candidates, wherein each of the template matching candidates is associated with a different motion vector; and selecting a template matching candidate from the list of template matching candidates, wherein based on the sub-pel precision mode being used to encode or decode the current block, the list of template matching candidates is reduced relative to when the sub-pel precision mode is not used.

Clause 4E. The method of any of clauses 1E-3E, wherein, based on the sub-pel precision mode being used for encoding or decoding the current block, a template matching fusion mode flag is not signaled.

Clause 5E. The method of any of clauses 1E-3E, wherein the sub-pel precision is quarter pixel precision.

Clause 6E. The method of any of clauses 1E-5E, wherein: the method further comprises generating a plurality of template matching (TM) candidates, wherein each of the TM candidates is associated with a respective prediction block and a respective motion vector predictor, and generating the plurality of TM candidates comprises, for each of the TM candidates: applying the interpolation filter to samples of a reference region indicated by the motion vector predictor associated with the TM candidate to generate a respective array of samples at full-pel and sub-pel precision; and identifying, within the respective array, a respective reference template of the respective prediction block, wherein the respective reference template of the respective prediction block is a best match for the template of the current block within the respective array; and generating the prediction block for the current block comprises generating, based on a combination of the respective prediction blocks associated with two or more TM candidates of the plurality of TM candidates, the prediction block for the current block.

Clause 7E. The method of clause 6E, wherein generating the prediction block for the current block comprises generating the prediction block for the current block as a linear combination of corresponding samples in the prediction blocks associated with the two or more TM candidates.

Clause 8E. The method of clause 7E, wherein generating the prediction block for the current block as the linear combination of the corresponding samples comprises: for each of the two or more TM candidates, calculating a template cost for the TM candidate, and generating the prediction block for the current block as a weighted average of the corresponding samples in the prediction blocks associated with the two or more TM candidates, wherein weights used in the weighted average are based on the template cost for the TM candidates.

Clause 9E. The method of clause 8E, wherein the weights are multiplicative inverses of template matching costs for the TM candidates.

Clause 10E. The method of any of clauses 8E-9E, wherein a flag indicates whether the weights are derived based on the template cost or based on mean squared error (MSE) minimization.

Clause 11E. The method of any of clauses 7E-10E, wherein the syntax element is a first syntax element and generating the prediction block for the current block as the linear combination of the corresponding samples comprises: determining a weight derivation method from among a plurality of weight derivation methods; applying the weight derivation method to derive weights of the two or more TM candidates; and generating the prediction block for the current block as a weighted average of the corresponding samples in the prediction blocks associated with the two or more TM candidates using the weights of the two or more TM candidates, wherein a second syntax element indicates the weight derivation method.

Clause 12E. The method of any of clauses 1E-11E, wherein: each fusion mode of a plurality of available fusion modes is associated with a different combination of two or more TM candidates in a plurality of TM candidates, a bitstream indicates a subset of the available fusion modes, a quantity of fusion modes in the subset is M, a quantity of the available fusion modes is N, where M<N, the fusion modes in the subset of available fusion modes have minimum combined template costs among the available fusion modes, applying the sub-pel precision mode comprises: for each fusion mode of the subset of the available fusion modes: for each TM candidate of the two or more TM candidates associated with the fusion mode: applying the interpolation filter to samples of a reference region indicated by a motion vector predictor associated with the TM candidate to generate a respective array of samples at full-pel and sub-pel precision; and identifying, within the respective array, a respective reference template of a respective prediction block for the TM candidate, wherein the respective reference template of the respective prediction block is a best match for the template of the current block within the respective array; and generating, based on a combination of the respective prediction blocks for the two or more TM candidates associated with the fusion mode, a prediction block for the fusion mode; and determining the prediction block for the current block from among the prediction blocks for the fusion modes.

Clause 13E. The method of any of clauses 1E-12E, wherein each fusion mode of a plurality of fusion modes is associated with a different combination of two or more TM candidates in a plurality of TM candidates, applying the sub-pel precision mode comprises: for each fusion mode of the plurality of fusion modes: for each TM candidate of the two or more TM candidates associated with the fusion mode: applying the interpolation filter to samples of a reference region indicated by a motion vector predictor associated with the TM candidate to generate a respective array of samples at full-pel and sub-pel precision; and identifying, within the respective array, a respective reference template of a respective prediction block for the TM candidate, wherein the respective reference template of the respective prediction block for the TM candidate is a best match for the template of the current block within the respective array; for each respective weighting set of a plurality of weighting sets: generating a prediction block for the respective weighting set as a weighted average of corresponding samples in the prediction blocks of the two or more TM candidates associated with the fusion mode, wherein weights used in the weighted average are included in the respective weighting set; and calculating a combined template cost of the prediction block for the respective weighting set; and selecting a weighting set for the fusion mode from among the plurality of weighting sets based on a minimum of the combined template cost of the prediction blocks for the weighting sets; and determining the prediction block for the current block from among the prediction blocks for the selected weighting sets for the plurality of fusion modes.

Clause 14E. A device for coding video data, the device comprising: memory to store the video data; and one or more processors implemented in circuitry, the one or more processors configured to: apply a sub-pel precision mode to generate a prediction block for a current block of the video data, wherein a syntax element is signaled to indicate that the sub-pel precision mode is applied to the current block and the one or more processors are configured to, applying the sub-pel precision mode: apply an interpolation filter to samples of a reference region to generate an array of samples at full-pel and sub-pel precision; and identify, within the array, a reference template of the prediction block, wherein the reference template of the prediction block is a best match for a template of the current block within the array, wherein a template pattern defines a shape of the reference template of the prediction block and the template of the current block; and encode or decode the current block using the prediction block for the current block.

Clause 15E. The device of clause 14E, wherein the syntax element is signaled based on a non-fusion template matching mode being used for the current block.

Clause 16E. The device of any of clauses 14E-15E, wherein the one or more processors are further configured to: generate a list of template matching candidates, wherein each of the template matching candidates is associated with a different motion vector; and select a template matching candidate from the list of template matching candidates, wherein based on the sub-pel precision mode being used to encode or decode the current block, the list of template matching candidates is reduced relative to when the sub-pel precision mode is not used.

Clause 17E. The device of any of clauses 14E-16E, wherein, based on the sub-pel precision mode being used for encoding or decoding the current block, a template matching fusion mode flag is not signaled.

Clause 18E. The device of any of clauses 14E-17E, wherein the sub-pel precision is quarter pixel precision.

Clause 19E. The device of any of clauses 14E-18E, wherein: the one or more processors are further configured to generate a plurality of template matching (TM) candidates, wherein each of the TM candidates is associated with a respective prediction block and a respective motion vector predictor, and the one or more processors are configured to, as part of generating the plurality of TM candidates, for each of the TM candidates: apply the interpolation filter to samples of a reference region indicated by the motion vector predictor associated with the TM candidate to generate a respective array of samples at full-pel and sub-pel precision; and identify, within the respective array, a respective reference template of the respective prediction block, wherein the respective reference template of the respective prediction block is a best match for the template of the current block within the respective array; and the one or more processors are configured to, as part of generating the prediction block for the current block, generate, based on a combination of the respective prediction blocks associated with two or more TM candidates of the plurality of TM candidates, the prediction block for the current block.

Clause 20E. The device of clause 19E, wherein the one or more processors are configured to, as part of generating the prediction block for the current block, generate the prediction block for the current block as a linear combination of corresponding samples in the prediction blocks associated with the two or more TM candidates.

Clause 21E. The device of clause 20E, wherein generating the prediction block for the current block as the linear combination of the corresponding samples comprises: for each of the two or more TM candidates, calculating a template cost for the TM candidate, and generating the prediction block for the current block as a weighted average of the corresponding samples in the two or more TM candidates, wherein weights used in the weighted average are based on the template cost for the TM candidate.

Clause 22E. The device of clause 21E, wherein the weights are multiplicative inverses of template matching costs for the TM candidates.

Clause 23E. The device of any of clauses 21E-22E, wherein a flag is signaled to indicate whether the weights are derived based on the template cost or based on mean squared error (MSE) minimization.

Clause 24E. The device of any of clauses 20E-23E, wherein the syntax element is a first syntax element and the one or more processors are configured to, as part of generating the prediction block for the current block as the linear combination of the corresponding samples: determine a weight derivation method from among a plurality of weight derivation methods; apply the weight derivation method to derive weights of the two or more TM candidates; and generate the prediction block for the current block as the weighted average of the corresponding samples in the prediction blocks associated with the two or more TM candidates using the weights of the two or more TM candidates, wherein a second syntax element indicates the weight derivation method.

Clause 25E. The device of any of clauses 14E-24E, wherein: each fusion mode of a plurality of available fusion modes is associated with a different combination of two or more TM candidates in a plurality of TM candidates, a bitstream indicates a subset of the available fusion modes, a quantity of fusion modes in the subset is M, a quantity of the available fusion modes is N, where M<N, the fusion modes in the subset of available fusion modes have minimum combined template costs among the available fusion modes, as part of applying the sub-pel precision mode, the one or more processors are configured to: for each fusion mode of the subset of the available fusion modes: for each TM candidate of the two or more TM candidates associated with the fusion mode: apply the interpolation filter to samples of a reference region indicated by a motion vector predictor associated with the TM candidate to generate a respective array of samples at full-pel and sub-pel precision; and identify, within the respective array, a respective reference template of a respective prediction block for the TM candidate, wherein the respective reference template of the respective prediction block is a best match for the template of the current block within the respective array; and generate, based on a combination of the respective prediction blocks for the two or more TM candidates associated with the fusion mode, a prediction block for the fusion mode; and determine the prediction block for the current block from among the prediction blocks for the fusion modes.

Clause 26E. The device of any of clauses 14E-25E, wherein each fusion mode of a plurality of fusion modes is associated with a different combination of two or more TM candidates in a plurality of TM candidates, and the one or more processors are configured to, as part of applying the sub-pel precision mode: for each fusion mode of the plurality of fusion modes: for each TM candidate of the two or more TM candidates associated with the fusion mode: apply the interpolation filter to samples of a reference region indicated by a motion vector predictor associated with the TM candidate to generate a respective array of samples at full-pel and sub-pel precision; and identify, within the respective array, a respective reference template of a respective prediction block for the TM candidate, wherein the respective reference template of the respective prediction block is a best match for the template of the current block within the respective array; for each respective weighting set of a plurality of weighting sets, generate a prediction block for the respective weighting set as a weighted average of corresponding samples in the prediction blocks of the two or more TM candidates associated with the fusion mode, wherein weights used in the weighted average are included in the respective weighting set; and calculate a combined template cost of the prediction block for the respective weighting set; and select a weighting set for the fusion mode from among the plurality of weighting sets based on a minimum of the combined template cost of the prediction blocks for the weighting sets; and determine the prediction block for the current block from among the prediction blocks for the selected weighting sets for the plurality of fusion modes.

Clause 27E. The device of any of clauses 14E-26E, further comprising a display configured to display decoded video data.

Clause 28E. The device of any of clauses 14E-27E, wherein the device comprises one or more of a camera, a computer, a mobile device, a broadcast receiver device, or a set-top box.

Clause 29E. The device of any of clauses 14E-28E, wherein the device comprises a video decoder.

Clause 30E. The device of any of clauses 14E-29E, wherein the device comprises a video encoder.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding or decoding video data, the method comprising:

applying a sub-pel precision mode to generate a prediction block for a current block of the video data, wherein a syntax element indicates that the sub-pel precision mode is applied to the current block and applying the sub-pel precision mode comprises:

applying an interpolation filter to samples of a reference region to generate an array of samples at full-pel and sub-pel precision; and identifying, within the array, a reference template of the prediction block, wherein the reference template of the prediction block is a best match for a template of the current block within the array, wherein a template pattern defines a shape of the reference template of the prediction block and the template of the current block;

generating a plurality of template matching (TM) candidates, wherein each of the TM candidates is associated with a respective prediction block and a respective motion vector predictor, and generating the plurality of TM candidates comprises, for each of the TM candidates:

applying the interpolation filter to samples of a reference region indicated by the motion vector predictor associated with the TM candidate to generate a respective array of samples at full-pel and sub-pel precision; and identifying, within the respective array, a respective reference template of the respective prediction block, wherein the respective reference template of the respective prediction block is a best match for the template of the current block within the respective array;

generating the prediction block for the current block as a linear combination of corresponding samples in the prediction blocks associated with two or more TM candidates of the plurality of TM candidates, wherein generating the prediction block for the current block as the linear combination of the corresponding samples comprises:

for each of the two or more TM candidates, calculating a template cost for the TM candidate, and generating the prediction block for the current block as a weighted average of the corresponding samples in the prediction blocks associated with the two or more TM candidates, comprising determining weights used in the weighted average based on the template cost for the TM candidates; and encoding or decoding the current block using the prediction block for the current block.

2. The method of claim 1, wherein the syntax element is signaled based on a non-fusion template matching mode being used for the current block.

3. The method of claim 1, further comprising:

generating a list of template matching candidates, wherein each of the template matching candidates is associated with a different motion vector; and selecting a template matching candidate from the list of template matching candidates, wherein based on the sub-pel precision mode being used to encode or decode the current block, the list of template matching candidates is reduced relative to when the sub-pel precision mode is not used.

4. The method of claim 1, wherein, based on the sub-pel precision mode being used for encoding or decoding the current block, a template matching fusion mode flag is not signaled.

5. The method of claim 1, wherein the sub-pel precision is quarter pixel precision.

6. The method of claim 1, wherein the weights are multiplicative inverses of template matching costs for the TM candidates.

7. The method of claim 1, wherein a flag indicates whether the weights are derived based on the template cost or based on mean squared error (MSE) minimization.

8. The method of claim 1, wherein the syntax element is a first syntax element and generating the prediction block for the current block as the linear combination of the corresponding samples comprises:

determining a weight derivation method from among a plurality of weight derivation methods;

applying the weight derivation method to derive weights of the two or more TM candidates; and generating the prediction block for the current block as a weighted average of the corresponding samples in the prediction blocks associated with the two or more TM candidates using the weights of the two or more TM candidates, wherein a second syntax element indicates the weight derivation method.

9. The method of claim 1, wherein:

each fusion mode of a plurality of available fusion modes is associated with a different combination of two or more TM candidates in a plurality of TM candidates, a bitstream indicates a subset of the available fusion modes, a quantity of fusion modes in the subset is M, a quantity of the available fusion modes is N, where M<N, the fusion modes in the subset of available fusion modes have minimum combined template costs among the available fusion modes, applying the sub-pel precision mode comprises:

for each fusion mode of the subset of the available fusion modes:

for each TM candidate of the two or more TM candidates associated with the fusion mode:

applying the interpolation filter to samples of a reference region indicated by a motion vector predictor associated with the TM candidate to generate a respective array of samples at full-pel and sub-pel precision; and identifying, within the respective array, a respective reference template of a respective prediction block for the TM candidate, wherein the respective reference template of the respective prediction block is a best match for the template of the current block within the respective array; and generating, based on a combination of the respective prediction blocks for the two or more TM candidates associated with the fusion mode, a prediction block for the fusion mode; and determining the prediction block for the current block from among the prediction blocks for the fusion modes.

10. The method of claim 1, wherein each fusion mode of a plurality of fusion modes is associated with a different combination of two or more TM candidates in a plurality of TM candidates, applying the sub-pel precision mode comprises:

for each fusion mode of the plurality of fusion modes:

for each TM candidate of the two or more TM candidates associated with the fusion mode:

applying the interpolation filter to samples of a reference region indicated by a motion vector predictor associated with the TM candidate to generate a respective array of samples at full-pel and sub-pel precision; and identifying, within the respective array, a respective reference template of a respective prediction block for the TM candidate, wherein the respective reference template of the respective prediction block for the TM candidate is a best match for the template of the current block within the respective array;

for each respective weighting set of a plurality of weighting sets:

generating a prediction block for the respective weighting set as a weighted average of corresponding samples in the prediction blocks of the two or more TM candidates associated with the fusion mode, wherein weights used in the weighted average are included in the respective weighting set; and calculating a combined template cost of the prediction block for the respective weighting set; and selecting a weighting set for the fusion mode from among the plurality of weighting sets based on a minimum of the combined template cost of the prediction blocks for the weighting sets; and determining the prediction block for the current block from among the prediction blocks for the selected weighting sets for the plurality of fusion modes.

11. A device for coding video data, the device comprising:

memory to store the video data; and one or more processors implemented in circuitry, the one or more processors configured to:

apply a sub-pel precision mode to generate a prediction block for a current block of the video data, wherein a syntax element is signaled to indicate that the sub-pel precision mode is applied to the current block and the one or more processors are configured to, applying the sub-pel precision mode:

apply an interpolation filter to samples of a reference region to generate an array of samples at full-pel and sub-pel precision; and identify, within the array, a reference template of the prediction block, wherein the reference template of the prediction block is a best match for a template of the current block within the array, wherein a template pattern defines a shape of the reference template of the prediction block and the template of the current block;

generate a plurality of template matching (TM) candidates, wherein each of the TM candidates is associated with a respective prediction block and a respective motion vector predictor, and the one or more processors are configured to, as part of generating the plurality of TM candidates, for each of the TM candidates:

apply the interpolation filter to samples of a reference region indicated by the motion vector predictor associated with the TM candidate to generate a respective array of samples at full-pel and sub-pel precision; and identify, within the respective array, a respective reference template of the respective prediction block, wherein the respective reference template of the respective prediction block is a best match for the template of the current block within the respective array;

generate the prediction block for the current block as a linear combination of corresponding samples in the prediction blocks associated with two or more TM candidates of the plurality of TM candidates, wherein to generate the prediction block for the current block as the linear combination of the corresponding samples the processors are configured to:

for each of the two or more TM candidates, calculate a template cost for the TM candidate, and generate the prediction block for the current block as a weighted average of the corresponding samples in the two or more TM candidates, wherein the processors are configured to determine the weights used in the weighted average based on the template cost for the TM candidate; and encode or decode the current block using the prediction block for the current block.

12. The device of claim 11, wherein the syntax element is signaled based on a non-fusion template matching mode being used for the current block.

13. The device of claim 11, wherein the one or more processors are further configured to:

generate a list of template matching candidates, wherein each of the template matching candidates is associated with a different motion vector; and select a template matching candidate from the list of template matching candidates, wherein based on the sub-pel precision mode being used to encode or decode the current block, the list of template matching candidates is reduced relative to when the sub-pel precision mode is not used.

14. The device of claim 11, wherein, based on the sub-pel precision mode being used for encoding or decoding the current block, a template matching fusion mode flag is not signaled.

15. The device of claim 11, wherein the sub-pel precision is quarter pixel precision.

16. The device of claim 11, wherein the weights are multiplicative inverses of template matching costs for the TM candidates.

17. The device of claim 11, wherein a flag is signaled to indicate whether the weights are derived based on the template cost or based on mean squared error (MSE) minimization.

18. The device of claim 11, wherein the syntax element is a first syntax element and the one or more processors are configured to, as part of generating the prediction block for the current block as the linear combination of the corresponding samples:

determine a weight derivation method from among a plurality of weight derivation methods;

apply the weight derivation method to derive weights of the two or more TM candidates; and generate the prediction block for the current block as the weighted average of the corresponding samples in the prediction blocks associated with the two or more TM candidates using the weights of the two or more TM candidates, wherein a second syntax element indicates the weight derivation method.

19. The device of claim 11, wherein:

each fusion mode of a plurality of available fusion modes is associated with a different combination of two or more TM candidates in a plurality of TM candidates, a bitstream indicates a subset of the available fusion modes, a quantity of fusion modes in the subset is M, a quantity of the available fusion modes is N, where M<N, the fusion modes in the subset of available fusion modes have minimum combined template costs among the available fusion modes, as part of applying the sub-pel precision mode, the one or more processors are configured to:

for each fusion mode of the subset of the available fusion modes:

for each TM candidate of the two or more TM candidates associated with the fusion mode:

apply the interpolation filter to samples of a reference region indicated by a motion vector predictor associated with the TM candidate to generate a respective array of samples at full-pel and sub-pel precision; and identify, within the respective array, a respective reference template of a respective prediction block for the TM candidate, wherein the respective reference template of the respective prediction block is a best match for the template of the current block within the respective array; and generate, based on a combination of the respective prediction blocks for the two or more TM candidates associated with the fusion mode, a prediction block for the fusion mode; and determine the prediction block for the current block from among the prediction blocks for the fusion modes.

20. The device of claim 11, wherein each fusion mode of a plurality of fusion modes is associated with a different combination of two or more TM candidates in a plurality of TM candidates, and the one or more processors are configured to, as part of applying the sub-pel precision mode:

for each fusion mode of the plurality of fusion modes:

for each TM candidate of the two or more TM candidates associated with the fusion mode:

apply the interpolation filter to samples of a reference region indicated by a motion vector predictor associated with the TM candidate to generate a respective array of samples at full-pel and sub-pel precision; and identify, within the respective array, a respective reference template of a respective prediction block for the TM candidate, wherein the respective reference template of the respective prediction block is a best match for the template of the current block within the respective array;

for each respective weighting set of a plurality of weighting sets, generate a prediction block for the respective weighting set as a weighted average of corresponding samples in the prediction blocks of the two or more TM candidates associated with the fusion mode, wherein weights used in the weighted average are included in the respective weighting set; and calculate a combined template cost of the prediction block for the respective weighting set; and select a weighting set for the fusion mode from among the plurality of weighting sets based on a minimum of the combined template cost of the prediction blocks for the weighting sets; and determine the prediction block for the current block from among the prediction blocks for the selected weighting sets for the plurality of fusion modes.

21. The device of claim 11, further comprising a display configured to display decoded video data.

22. The device of claim 11, wherein the device comprises one or more of a camera, a computer, a mobile device, a broadcast receiver device, or a set-top box.

23. The device of claim 11, wherein the device comprises a video decoder configured to decode the video data based on the prediction block.

24. The device of claim 11, wherein the device comprises a video encoder configured to encode the video data based on the prediction block.

* * * * *